| GEAR | FRONT TRANSMISSION | REAR TRANSMISSION SPEED CLUTCH | REAR TRANSMISSION RANGE CLUTCH | CROSS-DRIVE TRANSMISSION |
|---|---|---|---|---|
| 1ST | OVER-DRIVE OR TORQUE CONVERTER DRIVE | LO | LO | LO |
| 2ND | | LO | LO | HI |
| 3RD | | HI | LO | HI |
| 4TH | | LO | HI | HI |
| 5TH | | HI | HI | HI |
| 1ST REV. | | LO | REV. | LO |
| 2ND REV. | | HI | REV. | LO |

INVENTORS
HUGH C. MORRIS
SHAIRYL I. PEARCE
CHARLES A. RAMSEL
GERALD D. ROHWEDER

Fryer Tjensvold Feix Phillips & Lempio
ATTORNEYS

INVENTORS
HUGH C. MORRIS
SHAIRYL I. PEARCE
CHARLES A. RAMSEL
GERALD D. ROHWEDER
BY Frye, Gjemsold, Feix, Phillips & Lempio
ATTORNEYS INVENTORS
HUGH C. MORRIS
SHAIRYL I. PEARCE
CHARLES A. RAMSEL
GERALD D. ROHWEDER
BY
Fryer Tjensvold Feix Phillips & Lempio
ATTORNEYS INVENTORS
HUGH C. MORRIS
SHAIRYL I. PEARCE
CHARLES A. RAMSEL
GERALD D. ROHWEDER
BY
Fryer Tjensvold Feix Phillips & Lempio
ATTORNEYS INVENTORS
HUGH C. MORRIS
SHAIRYL I. PEARCE
CHARLES A. RAMSEL
GERALD D. ROHWEDER
BY
Fryer Tjensvold Feix Phillips & Lempio
ATTORNEYS Feb. 25, 1969 H. C. MORRIS ET AL 3,429,328

HYDRAULIC CONTROLS

Original Filed Aug. 23, 1962 Sheet 6 of 17

INVENTORS
HUGH C. MORRIS
SHAIRYL I. PEARCE
CHARLES A. RAMSEL
BY GERALD D. ROHWEDER

ATTORNEYS

INVENTORS
HUGH C. MORRIS
SHAIRYL I. PEARCE
CHARLES A. RAMSEL
GERALD D. ROHWEDER
BY
Fryer Tjensvold Feix Phillips & Lempio
ATTORNEYS INVENTORS
HUGH C. MORRIS
SHAIRYL I. PEARCE
CHARLES A. RAMSEL
GERALD D. ROHWEDER
BY Fryer Tjensvold Feix Phillips & Lempio
ATTORNEYS INVENTORS
HUGH C. MORRIS
SHAIRYL I. PEARCE
CHARLES A. RAMSEL
GERALD D. ROHWEDER
BY Fryer Tjensvold Feix Phillips & Lempio
ATTORNEYS INVENTORS
HUGH C. MORRIS
SHAIRYL I. PEARCE
CHARLES A. RAMSEL
GERALD D. ROHWEDER
BY
Fryer Tjensvold Feix Phillips & Lempio
ATTORNEYS INVENTORS
HUGH C. MORRIS
SHAIRYL I. PEARCE
CHARLES A. RAMSEL
GERALD D. ROHWEDER
BY
Fryer Tjensvold Feix Phillips & Lempio
ATTORNEYS INVENTORS
HUGH C. MORRIS
SHAIRYL I. PEARCE
CHARLES A. RAMSEL
GERALD D. ROHWEDER
BY
ATTORNEYS INVENTORS
HUGH C. MORRIS
SHAIRYL I. PEARCE
CHARLES A. RAMSEL
BY GERALD D. ROHWEDER
Fryer Tjensvold Feix Phillips & Lempio
ATTORNEYS INVENTORS
HUGH C. MORRIS
SHAIRYL I. PEARCE
CHARLES A. RAMSEL
GERALD D. ROHWEDER
BY Fryer Tjensvold Feix Phillips & Lempio
ATTORNEYS INVENTORS
HUGH C. MORRIS
SHAIRYL I. PEARCE
CHARLES A. RAMSEL
GERALD D. ROHWEDER
BY
Fryer, Tjensvold, Feix, Phillips & Lempio
ATTORNEYS

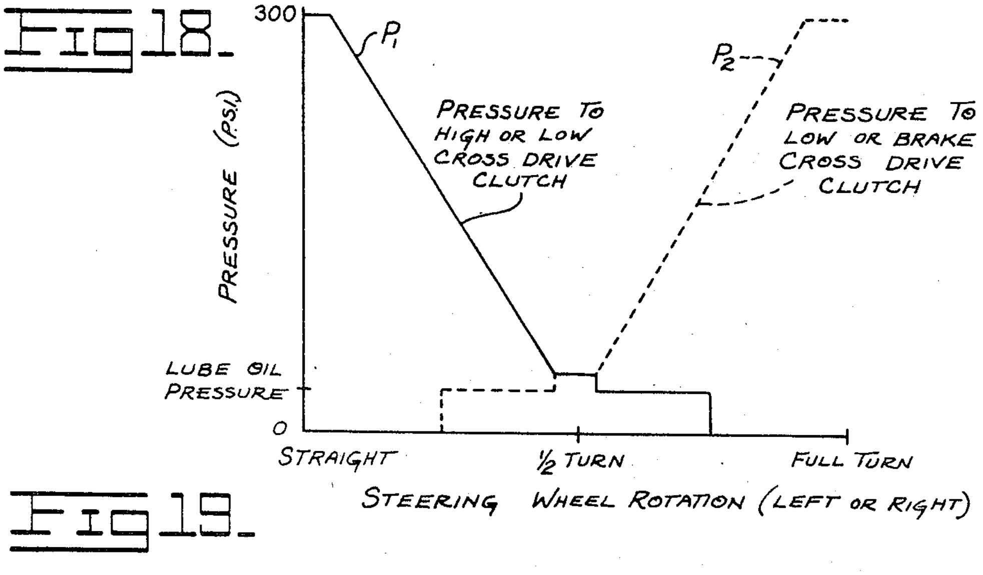

FIG. 18

FIG. 19

| GEAR | STRAIGHT AHEAD | | | | ½ TURN TO RIGHT | | | | FULL RIGHT TURN | | | |
|---|---|---|---|---|---|---|---|---|---|---|---|---|
| | W/O BRAKES | | W BRAKES | | W/O BRAKES | | W BRAKES | | W/O BRAKES | | W BRAKES | |
| | L | R | L | R | L | R | L | R | L | R | L | R |
| 1ST | $35_b$ | $32_b$ | $34_c\ 35_b\ 37_c$ | $32_b\ 33_c\ 36_c$ | $35_a$ | $32_c\ 36_c$ | $34_c\ 35_a\ 37_c$ | $32_c\ 33_c\ 36_c$ | $35_a$ | $36_b$ | $34_c\ 35_a\ 37_c$ | $32_c\ 33_c\ 36_b$ |
| 2ND | $34_b$ | $33_b$ | $34_b\ 35_a\ 37_c$ | $32_c\ 33_b\ 36_c$ | $34_a$ | $32_c\ 36_c$ | $34_a\ 35_c\ 37_c$ | $32_c\ 33_c\ 36_c$ | $34_a$ | $36_b$ | $34_a\ 35_c\ 37_c$ | $32_c\ 33_c\ 36_b$ |
| 3RD | $34_b$ | $33_b$ | $34_b\ 35_c\ 37_c$ | $32_c\ 33_b\ 36_c$ | $34_a$ | $32_c\ 36_c$ | $34_a\ 35_c\ 37_c$ | $32_c\ 33_c\ 36_c$ | $34_a$ | $36_b$ | $34_a\ 35_c\ 37_c$ | $32_c\ 33_c\ 36_b$ |
| 4TH | $34_b$ | $33_b$ | $34_b\ 35_c\ 37_c$ | $32_c\ 33_b\ 36_c$ | $34_a$ | $32_c\ 33_c$ | $34_a\ 35_c\ 37_c$ | $32_c\ 33_c\ 36_c$ | $34_a$ | $32_b$ | $34_a\ 35_c\ 37_c$ | $32_b\ 33_c\ 36_c$ |
| 5TH | $34_b$ | $33_b$ | $34_b\ 35_c\ 37_c$ | $32_c\ 33_b\ 36_c$ | $34_a$ | $32_c\ 33_c$ | $34_a\ 35_c\ 37_c$ | $32_c\ 33_c\ 36_c$ | $34_a$ | $32_b$ | $34_a\ 35_c\ 37_c$ | $32_b\ 33_c\ 36_c$ |
| 1ST R. | $35_b$ | $32_b$ | $34_c\ 35_b\ 37_c$ | $32_b\ 33_c\ 36_c$ | $35_a$ | $32_c\ 36_c$ | $34_a\ 35_c\ 37_c$ | $32_c\ 33_c\ 36_c$ | $35_a$ | $36_b$ | $34_c\ 35_a\ 37_c$ | $32_c\ 33_c\ 36_b$ |
| 2ND R. | $35_b$ | $32_b$ | $34_c\ 35_b\ 37_c$ | $32_b\ 33_c\ 36_c$ | $35_a$ | $32_c\ 36_c$ | $34_a\ 35_c\ 37_c$ | $32_c\ 33_c\ 36_c$ | $35_a$ | $36_b$ | $34_c\ 35_a\ 37_c$ | $32_c\ 33_c\ 36_b$ |
| | $P_1 = 300$ | | | | $P_1 < 100$ | | | | $P_1 = 0$ | | $P_1 < 100$ | |
| | $P_2 = 0$ | | $P_2 < 100$ | | $P_2 < 100$ | | | | $P_2 = 300$ | | | |
| | $P_3 = 410$ | | | | | | | | | | | |
| | $P_4 = 0$ | | $P_4 < 100$ | | $P_4 = 0$ | | $P_4 < 100$ | | $P_4 = 0$ | | $P_4 < 100$ | |

SYMBOLS USED:

a = 410 P.S.I.
b = 300 P.S.I.
c = <100 P.S.I.

INVENTORS
HUGH C. MORRIS
SHAIRYL I. PEARCE
CHARLES A. RAMSEL
BY GERALD D. ROHWEDER
Fryer Tenhouse Feix Phillips & Lempio
ATTORNEYS INVENTORS
HUGH C. MORRIS
SHAIRYL I. PEARCE
CHARLES A. RAMSEL
GERALD D. ROHWEDER
BY
Fryer Tjensvold Feix Phillips & Lempio
ATTORNEYS United States Patent Office 3,429,328

Patented Feb. 25, 1969

3,429,328

HYDRAULIC CONTROLS

Hugh C. Morris, Peoria, Shairyl I. Pearce, East Peoria, and Charles A. Ramsel and Gerald D. Rohweder, Peoria, Ill., assignors to Caterpillar Tractor Co., Peoria, Ill., a corporation of California Original application Aug. 23, 1962, Ser. No. 219,049, now Patent No. 3,239,020, dated Mar. 8, 1966. Divided and this application Apr. 8, 1965, Ser. No. 455,358

U.S. Cl. 137—118 11 Claims

Int. Cl. G05d *11/03;* F16k *31/12*

ABSTRACT OF THE DISCLOSURE

Valve means for selectively controlling the pressure and direction of flow of fluid in the power train of a track type vehicle. The valves include a hydraulic steering pressure control valve, a hydraulic fluid selector valve, and a pressure control valve, each of which controls specific portions of the power train hydraulic system.

This application is a divisional application from United States patent application Ser. No. 219,049 filed on Aug. 23, 1962, now Patent No. 3,239,020 issued on Mar. 8, 1966.

The present invention relates to hydraulic controls and more particularly to hydraulic controls for the power train of a track type vehicle.

The type of power train with which the present invention is most advantageously employed includes a cross drive transmission having a plurality of selectable operating gear ratios. A power train of this type is described in detail in assignee's U.S. Patent 3,137,182, dated June 16, 1964 for "Track Type Vehicle Power Train." The cross drive transmission described therein receives input power from a range transmission and delivers output power to two separate output shafts, each of which is connected to one of the vehicle track drive mechanisms. Each of the output shafts associated with the cross drive transmission is driven through a separate planetary gearing system having two operating gear ratios. The operating gear ratio of the planetary system associated with one shaft is independent of the other gear system and output shaft, thereby enabling the vehicle tracks to be driven at different speeds for steering purposes.

The cross drive transmission also includes a pair of brakes, one associated with each output shaft. The brakes can be either hydraulically or mechanically actuated, and are employed for both stopping and steering the vehicle. The brakes are hydraulically actuated in response to steering wheel rotation (under some conditions) or brake pedal depression. Since the cross drive transmission gearing systems as well as the brakes can be employed to aid in stopping the vehicle, depression of the brake pedal preferably results in more than mere application of the brakes. The same is true of steering. While the brakes provide the main steering means (braking one track while driving the other) the cross drive transmission can be advantageously employed to aid in steering and at higher traveling speeds may provide the sole steering means.

A vehicle which has a fairly wide range of traveling speeds (which a vehicle employing the power train of the above mentioned patent would have) presents a rather complicated steering problem. The means employed to steer the vehicle when it is being operated in a lower gear, and thus at slow speeds, cannot be employed at higher gears, in which the vehicle may be traveling at high speed, as the vehicle would be likely to lose its traction and skid or even roll. Thus various degrees of steering must provided for and employed in accordance with the particular conditions under which the vehicle is being operated. The degrees of steering can vary from an extremely sharp turn induced by fully braking one track while driving the other in high gear, to a gradual turn induced by driving one track at low gear and the other at high gear. Further, it is desirable to be able to execute a large radius turn at slow speeds in low gear or to execute a relatively sharp turn at a higher gear with the vehicle operated at partial throttle. Thus, more is required than merely providing means which decreases the degree of steering with increased gear ratio.

While the power train described in the patent application referred to above includes all of the essential elements for providing the desired vehicle operations discussed above, these elements can only be put to work through a control system between the vehicle operator and the power train. A track type vehicle which is extremely versatile, as most vehicles employing this power train should be, would necessarily include working components (e.g., earth digging bucket, etc.). These components are generally controlled by the vehicle operator through a number of actuating levers which must often be manipulated at the same time that the vehicle is being driven. It is thus highly desirable to minimize the amount of physical operator control necessary to employ a given control system associated with the vehicle.

The control system of the present invention is responsible for selecting one of ten forward gears or four reverse gears, for applying the vehicle brakes and engaging cross drive transmission clutches to stop the vehicle, and to operate the cross drive transmission for steering purposes which includes not only the proper selection of gears and brakes for a given set of traveling conditions but also cross modulation to provide smooth operation and a minimum of power loss. While the control system must provide means for effecting these complex operations, it must at the same time be comprised of a minimum number of hydraulic control elements for purposes of reliability and to prevent over-taxing the source of hydraulic working fluid which also services other parts of the vehicle.

Accordingly, it is an object of the present invention to provide hydraulic controls for a vehicle power train, wherein a minimum number of operator manipulated elements are necessary for utilizing the controls, and a minimum number of components are employed to perform the necessary functions.

A further object of the present invention is to provide a hydraulic control system, and components therefor, which operates the power train of a track type vehicle in a manner providing various degrees of vehicle steering to correspond to a wide range of traveling conditions.

Another object of the present invention is to provide a control system for the power train of a track type vehicle wherein the control system reduces to a minimum the period of interrupted power transmission through the power train while shifting gears and steering.

A further object is to provide a dump and fill system for one part of the power train to enable a torque converter to be selectively employed without the necessity of employing an additional clutch in connection therewith.

Futher objects include providing various system components which perform dual and triple functions to thereby reduce the number of elements in the system, providing means for cross modulating the clutch and brake engagement and disengagement which occurs when the vehicle is being steered and other more specific objects and advantages which are made apparent in the following specification wherein a preferred form of the invention is described by reference to the accompanying drawings.

In the drawings:

FIG. 18 is a graph illustrating the relative pressures to the actuating means on one side of the cross drive transmission as a function of steering wheel rotation;

FIG. 19 is a chart of the use of the various cross drive gear selecting means during various operating conditions and at various gear ratios.

All of the gear selecting means of the particular power train with reference to which the present invention is described are ring gear retarding means often referred to as brakes; except for a single engaging means which rotates after being actuated and commonly referred to as a clutch. A further actuation means which, although not employed for the selection of operating gear ratios, is an important part of the vehicle power train is responsive to actuating fluid by retarding the rotation of the output shafts of the cross drive transmission—this of course is commonly referred to as a brake. Inasmuch as two kinds of gear selecting means and two types of brakes are employed in the power train, for the purposes of clarity, all gear selecting means, whether of the clutch or brake type, will be referred to by the term clutch, whereas rotation retarding means will be referred to as brakes. This particular selection of terminology is, of course, not meant to limit the control system to use with a power train employing only clutch-type gear selecting means any more than it is to be understood that the control system is limited to the particular power train with which reference is made in describing the system. It will be well understood by those familiar in the art that by minor modification the control system disclosed in detail below can be adapted for use with a wide variety of power trains, especially those which employ cross drive transmissions.

Figures 1, 2:
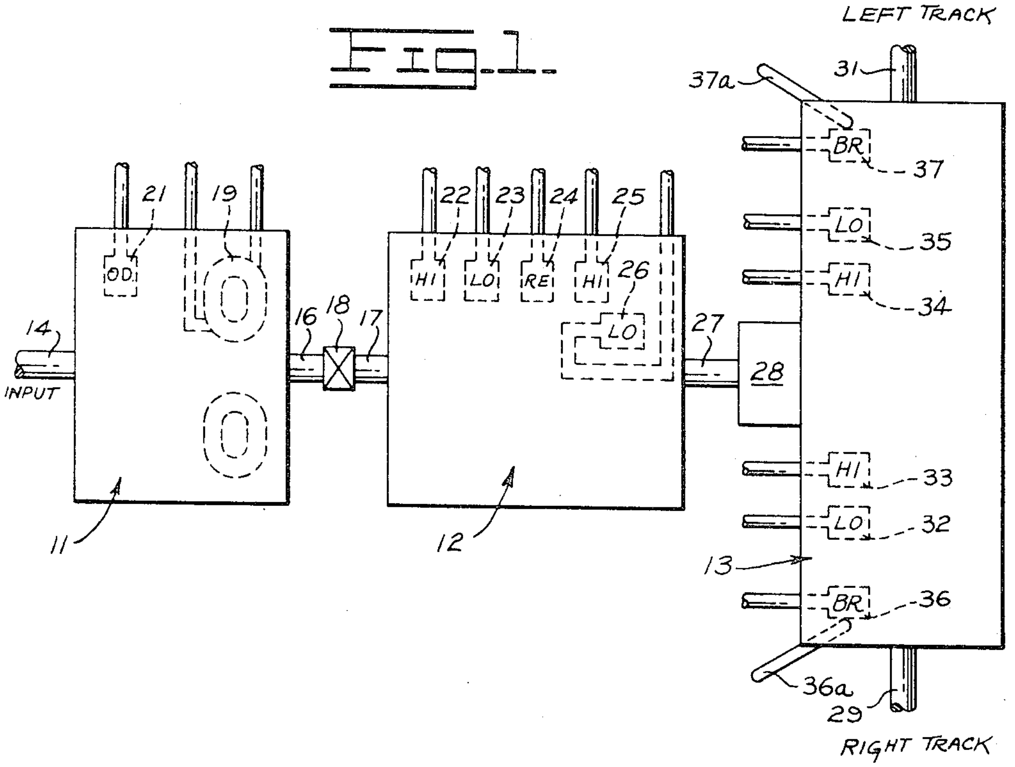
FIG. 1 is a schematic illustration showing the various components of the vehicle power train for which the present invention provides a control system.
FIG. 2 is a chart which sets forth the various gear engaging means which must be actuated to condition the drive train to one of the ten forward speeds or four reverse speeds at which the power train can be operated.

Referring now to FIG. 1, the vehicle power train with reference to which the present invention will be described, includes a front transmission 11, a range transmission 12, and a cross drive planetary transmission 13, all of which combine to provide a choice of ten speeds forward and four speeds in reverse. Front transmission 11 receives input power from the vehicle power plant (not shown) at input shaft 14 and delivers power through its output shaft 16 to input shaft 17 of range transmission 12 through a suitable connection 18. Front transmission 11 operates in either of two conditions—mechanical overdrive or split drive, wherein part of the power is directed through a troque converter 19. The transmission is conditioned for mechanical overdrive by engagement of overdrive clutch 21 and conditioned for split drive by filling torque converter 19 with sufficient pressure fluid. The actuation of overdrive clutch 21 and torque converter 19 being filled with fluid are mutually exclusive conditions such that the selection of one of the operating conditions of transmission 11 automatically excludes the other.

Range transmission 12 is conditioned by actuation of one of speed clutches 22 or 23 and one of range clutches 24, 25 or 26. Of the two speed clutches, engagement of clutch 22 results in a high ratio gearing with respect to the gear ratio obtained when clutch 23 is actuated. Range clutches 24, 25 and 26 provide high gear ratio to the output when clutch 25 is actuated, a lower gear ratio to the output when clutch 26 is actuated, and a reverse drive to the output when clutch 24 is actuated. The reverse clutch 24 can be actuated in combination with either clutch 22 or clutch 23 thus providing two possible reverse speeds, and either one of these combinations can be operated with the front transmission 11 in either overdrive or split drive, thus providing four possible reverse speeds. In general, front transmission 11 can be operated in either overdrive or split drive (torque converter drive) with any of the possible combinations of speed clutches and range clutches of transmission 12 and these combinations further in combination with possible selection of gear ratios of cross drive transmission 13 to be described.

An output shaft 27 delivers power from range transmission 12 to cross drive transmission 13 through appropriate gearing 28. Power is delivered from the cross drive transmission to the right vehicle track (not shown) via output shaft 29 and to the left vehicle track (not shown) by way of output shaft 31. The particular gear ratio at which the input power flows through the cross drive transmission is dependent upon which of gear ratio selecting clutches 32, 33, 34 or 35 is actuated. Engagement of clutch 33 provides a relatively high gear ratio to output shaft 29 as compared to the lower gear ratio obtained when clutch 32 is engaged. In the same manner, power is delivered to the left track through output shaft 31 at a relatively high gear ratio when clutch 34 is engaged as compared to the lower gear ratio obtained when clutch 35 is engaged. During normal, straight ahead driving both of the output shafts of transmission 13 will be driven through their respective high gear or low gear at the same time. When, however, it is desired to turn the vehicle, the independent nature of the drive systems to output shafts 29 and 31, enables operation of one at a low gear ratio while the other is operated at a high gear ratio.

Each of the output shafts 29 and 31 also has associated with it hydraulically actuated brakes 36 and 37, respectively. Brakes 36 and 37 are not effective in conditioning the transmissions through which power is delivered to the output shafts but rather provide means by which the output shaft can be grounded to the transmission housing in order to stop rotation of the shaft and thus bring the vehicle to a halt. Brakes 36 and 37 are also mechanically operable by manually actuated levers 36*a* and 37*a* respectively.

As shown in the chart of FIG. 2, there are five combinations of clutches which when actuated give rise to five forward operating speeds (vehicle speed increasing as the gear ratio is shifted towards fifth). Each one of these five possible forward gear ratios can be operated either with the front transmission in overdrive or split drive thus giving rise to ten speeds forward. The four reverse speeds were explained above.

OVERALL CONTROL SYSTEM

Figure 4:
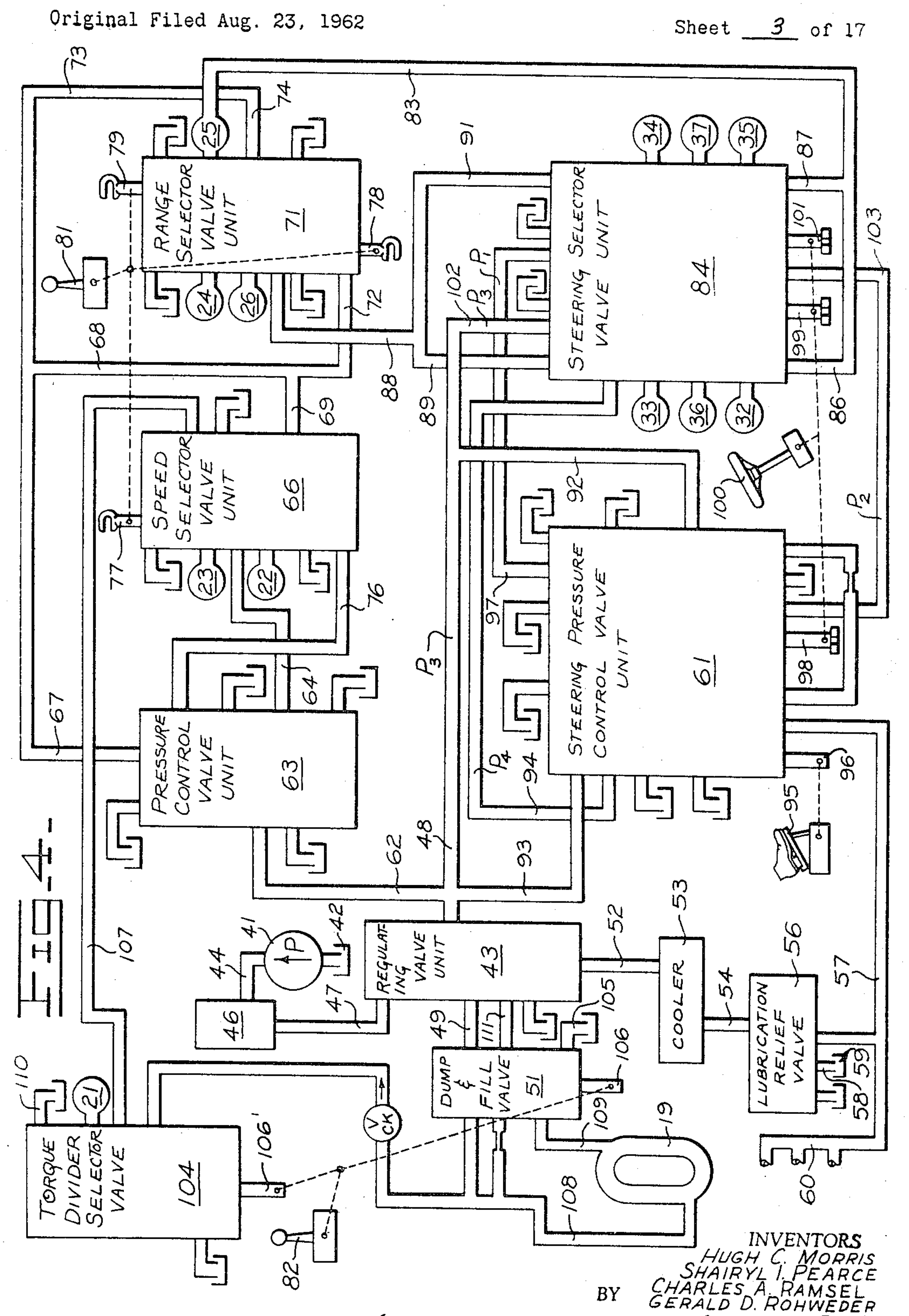
FIG. 4 is a schematic illustration of the overall control system.

Referring now to FIG. 4, a pump 41 draws hydraulic fluid from a source 42 and directs it to a regulating valve unit 43 through a conduit 44, a filter 46 and conduit 47. One source of output fluid from valve unit 43 is delivered through conduit 48 and serves as a main pressure fluid trunk line for a major portion of the control system. The fluid in conduit 48 is maintained at a fixed pressure, $P_3$, at all times by virtue of the action of regulating valve 43. While the value of pressure $P_3$ is depndent on a great many factors which will vary from system to system; in the present system $P_3$ is approximately 410 p.s.i. A second source of pressure regulated fluid from valve unit 43 is delivered by conduit 49 to a dump and fill valve 51 for operation of the front transmission 11, while a third regulated output is delivered by conduit 52 through a cooler 53 and then through another conduit 54 to a lubrication relief valve 56. Lubrication relief valve 56 provides a source of low pressure (approximately 20 p.s.i.) fluid in conduit 57 while the excess fluid delivered to the valve is diverted through a conduit 58 to a sump 59. The lubricating pressure fluid in conduit 57 is directed by several conduits 60 to various components of the tractor requiring lubrication such as the transmission and steering system (not shown), as well as to a steering pressure control valve unit 61.

A conduit 62 off of main trunk line 48 supplies a pressure control valve unit 63 with a source of input pressure fluid. One output from pressure control valve unit 63 is carried through conduit 64 to speed selector valve unit 66 with which speed clutches 22 and 23 of range transmission 12 communicate. A second output from pressure control valve unit 63 is carried by conduit 67 and delivered to speed selector valve unit 66 via conduits 68 and 69 as well as to a range selector valve unit 71 via conduits 68 and 72. The output pressure fluid in conduit 67 is also delivered to range selector valve unit 71 by way of conduits 73 and 74. Range selector valve unit 71 is in communication with range clutches 24, 25 and 26 of range transmission 12 and as will be described in detail below selects which of these clutches receives actuating fluid.

Pressure control valve unit 63 modulates the pressure delivered to the valve selector units so that a clutch selected by each of the units is engaged in a gradual, smooth manner. A further function of valve unit 63 is to maintain a predetermined pressure difference between the fluid in output conduit 64 and that in conduit 67 so that the higher pressure in conduit 67 will cause the particular range clutch selected to be engaged before the selected speed clutch, thus insuring that the speed clutches pick up the load. By insuring that the speed clutches will always pick up the load, only these clutches need be specifically designed to withstand heavy loads. A conduit 76 between speed selector valve unit 66 and pressure control valve unit 63 provides a safety reset signal when the transmission has been shifted to a neutral position.

Figure 3:
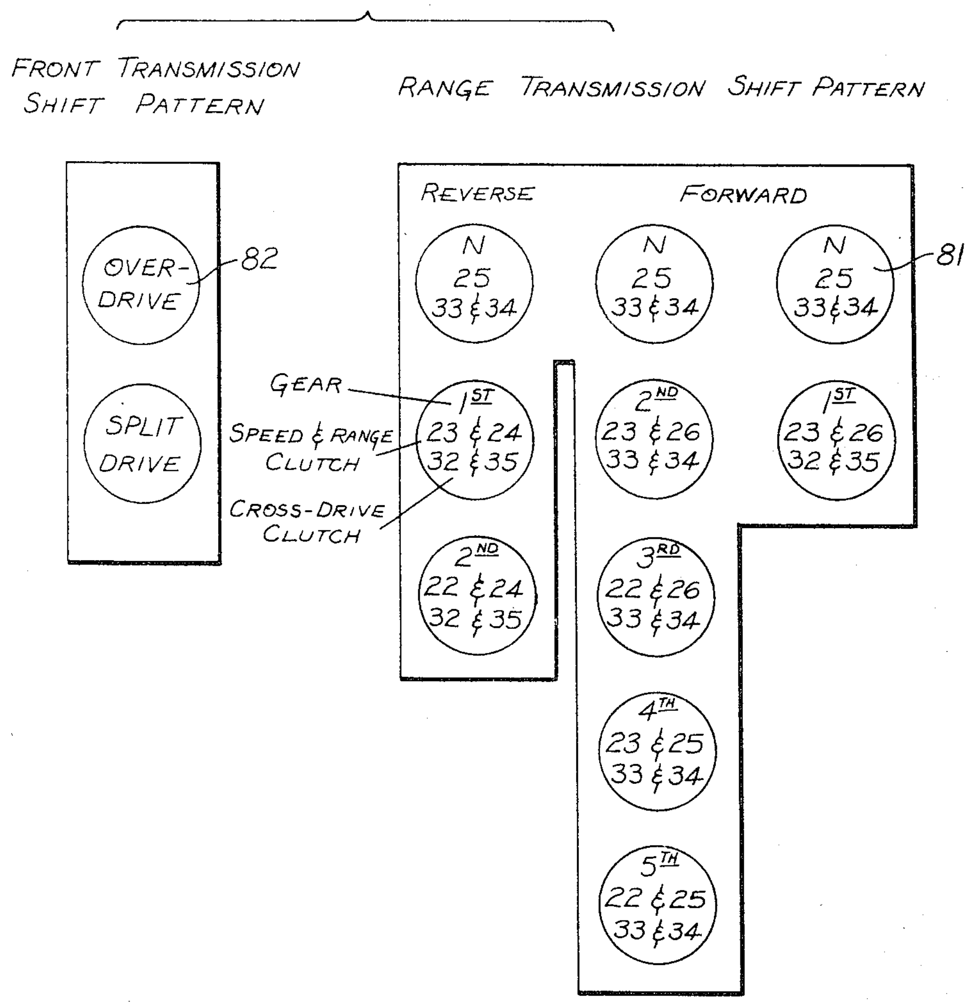
FIG. 3 is a diagram illustrating the shift pattern of the two transmission control levers.

Speed selector valve unit 66 has a lever 77 connected to a valve spool which determines which, if either, of clutches 22 or 23 receives working fluid, while range selector valve unit 71 has a pair of levers 78 and 79 which are connected to a directional valve spool and range selector valve spool, respectively. All three levers, 77, 78 and 79, are interconnected by appropriate linkage and are positioned by operation of a single gear control lever 81 having the shift pattern shown in FIG. 3. FIG. 3 also illustrates the two positions of separate control lever 82 which selects one of the two possible conditions of the front transmission 11. The manner in which the flow of fluid through the selector valve units is effected by shifting of control lever 81 from one position to another will be described below in conjunction with a detailed description of the selector valve units.

Whenever range selector valve unit 71 is conditioned to direct actuating fluid to clutch 25 (when the power train is in fourth or fifth gear forward or neutral) a conduit 83 becomes charged with fluid and causes a signal to be received by a steering selector valve unit 84 through connecting conduits 86 and 87. Whenever range selector valve unit 71 is conditioned to first gear forward or first or second gear reverse, a conduit 88 from the valve unit is charged with fluid and provides a signal to steering selector valve unit 84 via connecting conduits 89 and 91. As will be explained in detail below, the hydraulic signals provided through conduits 83 or 88 condition a portion of selector valve unit 84 to direct pressure fluid to particular cross drive transmission clutches.

A conduit 93 leads from trunk line 48 to steering pressure control valve unit 61 for the purpose of providing fluid pressure in conduit 94 when a lever 96, which is connected to a vehicle brake pedal 95 is moved upwardly. The pressure in conduit 94, $P_4$, is variable between approximately 0 and 100 p.s.i. depending on the amount which the brake pedal 95 is depressed. Whenever fluid pressure exists in conduit 94, brakes 36 and 37 which communicate with steering selector valve unit 84 are engaged to stop or slow the vehicle.

A branch line 92 also delivers a source of pressure fluid from main trunk line 48 to steering pressure control valve 61. The fluid supplied by conduit 92 is acted upon by unit 61 to provide a modulated source of pressure, $P_1$, to steering selector valve unit 84 through conduit 97. This pressure fluid is directed to the selected cross drive transmission clutches and provides the pressure with which the cross drive clutches are engaged. The particular clutches which are engaged will depend upon the position of certain valve spools in steering selector valve unit 84, which is dependent upon the existence or non-existence of a fluid signal in conduits 83 and 88. While the spools which direct the flow of hydraulic fluid to the cross drive transmission clutches are not mechanically connected to the selector spools of valve units 66 and 71, their position is dependent upon the positions of the last mentioned selector spools. Thus, the single control lever 81 determines which of the two speed clutches, which of the three range clutches, and which of the four cross drive clutches will be engaged.

A lever 98 associated with steering pressure control valve unit 61 and a pair of levers 99 and 101 associated with steering selector valve unit 84 are all mechanically connected to the vehicle steering wheel 100 and positioned in accordance with rotation thereof. A detailed description of the manner in which vehicle steering is accomplished by movement of levers 98, 99 and 101 will be given below. It suffices to say at this point that rotation of the steering wheel 100 causes lever 98 to move upwards, which effects the pressure of the fluid in output conduit 97, and positions either lever 99 or lever 101 (depending on the direction of steering wheel rotation) upwardly to direct pressure fluid made available by conduit 102 to a clutch associated with one of the two vehicle tracks.

A further source of pressure fluid $P_2$, is delivered through steering pressure control valve unit 61 to steering selector valve unit 84 via conduit 103 for purposes of steering and under certain conditions for purposes of braking. The $P_2$ pressure conduit 103 is less than 100 p.s.i. when employed for the purposes of braking and may be as high as 310 p.s.i. when employed for steering.

A torque divider selector valve 104 and the dump and fill valve 51 are operated by the positioning of levers 106' and 106, respectively. These levers are mechanically connected together and in turn connected to control lever 82 (see also FIG. 3) such that when the control lever is positioned to the overdrive shift position a regulated source of hydraulic fluid from speed selector valve unit 66 is communicated to torque divider selector valve 104 via conduit 107 to fill and pressurize overdrive clutch 21. In this same position the dump and fill valve is conditioned such that fluid directed therefrom to torque converter 19 via conduit 108 is unable to charge up the torque converter because of the return conduit 109 from the torque converter being in communication with a dump line 105. When control lever 82 is positioned to the torque converter shift pattern, clutch 21 is blocked from conduit 107 and communicated with dump line 110 while the torque converter 19 is allowed to charge with fluid by communicating the return line 109 with a pressurized compartment in valve unit 43, via conduit 111.

While the overall system as explained is relatively complex, an understanding of its operation can be simplified by first recognizing the system as being comprised of two main sections—that controlling the front transmission (regulating valve unit 43, dump and fill valve 51, and torque divider selector valve 104), and that controlling the rest of the power train (regulating valve unit 43, lubrication relief valve 56, pressure control valve unit 63, speed selector and range selector valve units 66 and 71, respectively, steering pressure control valve unit 61 and steering selector valve unit 84). These two portions of the system are independently controlled and can be discussed for the most part without reference to one another.

An understanding of the last mentioned portion of the system is aided by considering its operation under the following conditions: straight ahead driving; braking while driving straight ahead; steering; and braking while steering. Under the first condition—steering straight ahead—the three selector valve units (66, 71 and 84) determine which of the clutches in the range transmission and cross drive transmission are engaged. Pressure control valve unit 63 supplies the engaging fluid for the selector units 66 and 71 while the steering pressure control valve unit 61 supplies the engaging pressure ffuid ($P_1$) for selector unit 84. And the particular clutches engaged are determined by the position of control lever 81.

When the brake pedal is depressed (second condition above) steering pressure control valve unit 61 furnishes steering selector valve unit 84 with an additional source of pressure fluid ($P_4$), via conduit 94, which engages the brakes and the disengaged clutches of the cross drive transmission.

When the steering wheel is rotated—third condition—the magnitude of pressure fluid, $P_1$, to steering selector valve unit 84 is reduced and a supplementary source of fluid pressure, $P_3$, is directed to maintain the selected clutch on one side engaged, while a second supplementary source of fluid pressure, $P_2$, engages either a brake, a clutch, or both, on the other side. Actually the system reacts to a sharp full turn of the steering wheel differently than a slow or half turn to enable a desired turning radius to be achieved. The particular combination of clutches and brakes engaged in response to rotation of the steering wheel is dependent upon the gear in which the vehicle is traveling and the manner and extent of steering wheel rotation. But in all cases, the additional control comes from fluid pressure sources $P_3$ and $P_2$.

When steering is accompanied by hydraulic braking, the effect is a general combination of the last two described conditions with slight modifications.

PRESSURE CONTROL VALVE UNIT

It is the primary purpose of the pressure control valve unit 63 to provide two sources of regulated fluid pressure; one to speed selector valve unit 66 and another to range selector valve unit 71. As mentioned above the fluid pressure made available to the range selectors valve unit is, at all times, maintained at a higher pressure than the fluid provided to the speed selector valve unit to insure that the speed clutches of the range transmission 12 pick up the load of the vehicle. It is also a requirement of the pressure control valve unit that the two sources of fluid pressure be modulated so that the clutches are engaged with gradually increasing pressure to provide smooth operation and prevent damage to the transmission components.

Figure 21:
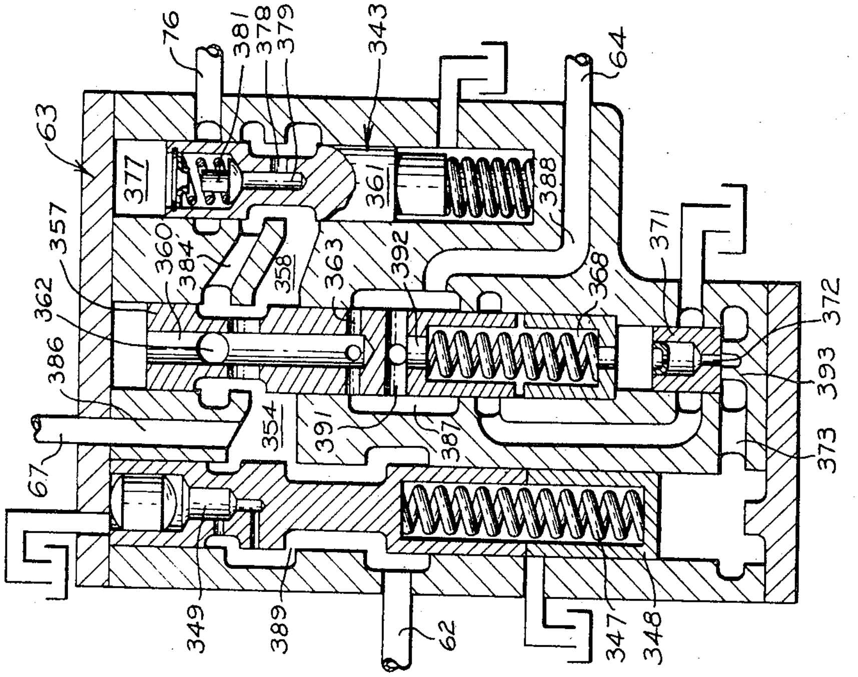
FIGS. 20 and 21 are schematic illustrations, in cross section, of a pressure control valve unit.
Figure 20:
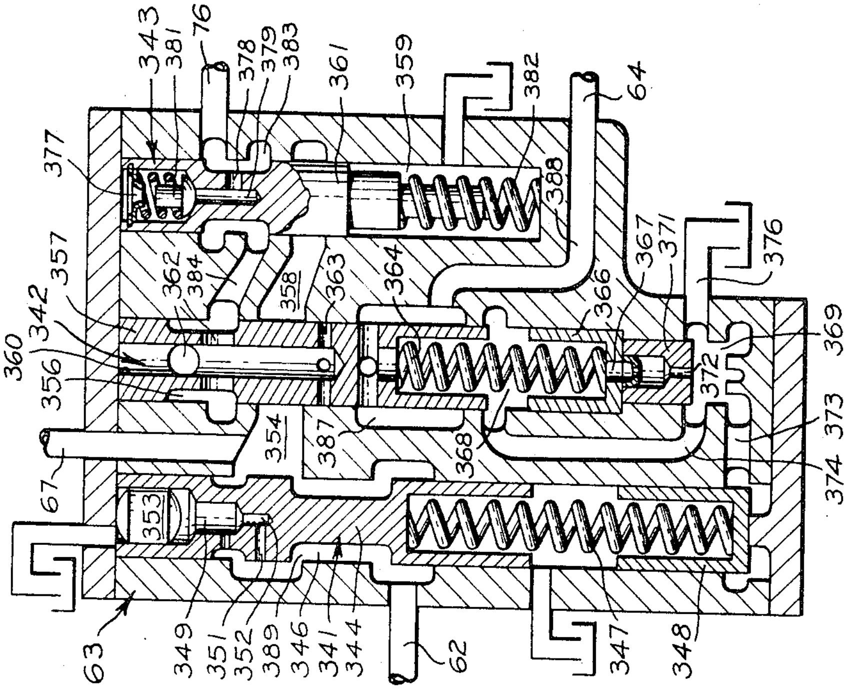

Referring to FIGS. 20 and 21, pressure control valve unit 63 comprises a modulating reducing valve generally indicated at 341, a pressure differential valve generally indicated at 342 and a safety reset valve generally indicated at 343. Modulating reducing valve 341 comprises a valve spool 344 slidably disposed in a valve bore 346 and spring biased in an upward direction (as shown) by a valve spring 347 which seats at one end on valve spool 344 and at its other end on a load piston 348. Valve spool 344 has a chamber 349 which communicates with the valve bore 346 through an orifice 351 and an inlet bore 352. A slug 353 in chamber 349 serves as a reaction member against which pressure fluid which enters chamber 349 exerts a force for the purpose of moving spool 344 downward.

A passage 354 communicates valve bore 346 with the bore 356 in which pressure differential valve spool 357 is slidably disposed as well as with a passage 358 which is in communcation with the bore 359 of safety valve spool 361. Pressure differential valve spool 357 has a central chamber 360 with inlet ports 362 at one end and outlet ports 363 at the other end. The valve spool 357 is spring biased to its upward position (FIG. 20) by a spring 364 which seats at one end on the valve spool and at its other end on a fixed spring seat 366. Spring seat 366 has an opening 367 in its lower end which provides communication between spring chamber 368 and a bore 369 having check valve 371 slidably disposed therein. Check valve 371 has a restrictive orifice 372 in its lower end which communicates with a passage 373 leading to load piston 348 of modulating reducing valve 341. A passage 374 forms communication between spring chamber 368 and check valve bore 369 so that a dump line 376 communicates with the spring chamber 368 when valve spool 357 is in its upward position.

Safety reset valve 343 has a chamber 377 in its upper end with which a conduit 76 from speed selector valve unit 66 communicates through port 378, bore 379, and poppet valve 381, when the valve spool 361 is in its upward position (FIG. 20) by virtue of the force exerted by biasing spring 382. Conduit 76 is also in communication with an annular recess 383 which surrounds the upper portion of safety valve spool 361 and which communicates with the bore 356 of differential valve 342 by way of passage 384.

Conduit 67 which supplies the main source of fluid pressure to range selector valve unit 71 communicates with passage 354 by way of passage 386 while conduit 64 providing the main source of pressure to speed selector valve unit 66 communicates via passage 388 with an annular recess 387 around the pressure differential valve 342. FIG. 20 illustrates the components in the positions which they assume when no fluid pressure is presented to the system, and consequently the biasing springs provide the only forces acting upon the various valve spools. As fluid enters bore 346, via conduit 62 from regulating valve unit 43, passages 354 and 358 fill with fluid as does chamber 349. The pressure in chamber 349 reacting against slug 253 will quickly be sufficient to create a force sufficient to overcome spring 347 and thereby close the annular opening 389 preventing a further buildup of pressure within the system. This results only in a small amount of pressure being delivered to range selector valve unit 71 via conduit 67 and no pressure fluid being delivered to speed selector valve unit 66. In order for the system to operate so as to provide the desired pressure to both of the selector units it is necessary for a safety reset signal to be received by conduit 76. This signal will be received whenever the transmission control lever 81 is shifted to a neutral position.

When a safety reset signal (source of hydraulic pressure fluid) is received through conduit 76, fluid will flow into recess 383, chamber 377 and passageway 384. As pressure builds up in chamber 377 it will provide a reaction force against safety reset valve biasing spring 382 and urge the spool 361 downwardly. The fluid which enters passage 384 will flow into chamber 360 of pressure differential valve spool 357 via ports 362, and cause pressure to build up therein (ports 363 being blocked) thus urging valve spool 357 downwardly against its biasing spring 364. When safety reset valve spool 361 moves downwardly a sufficient distance to establish communication between passage 358 and recess 383 (see FIG. 21) the pressure in passage 354 will be communicated to chamber 377 and will be sufficient to sustain the safety reset valve open in spite of the fact that the conduit 76 is blocked. This movement of safety reset valve 343 further provides communication between passage 358 and passage 384 thus enabling the pressure in chamber 354 to enter central chamber 360 and continue to urge valve spool 357 downward. As spool 357 moves downward inlet ports 362 will communicate directly with passage 354 while outlet ports 363 will be aligned with recess 387 thereby providing a path from passage 354 to output conduit 64. As the fluid fills the clutch to which conduit 64 eventually leads, pressure will rise in recess 387 which will cause a rise in the pressure of the fluid which enters spring chamber 368 by way of ports 391 and opening 392. A rise in the pressure of the fluid in spring chamber 368 will cause check valve 371 to move downward until it contacts stop 393. As the pressure continues to build up fluid will flow through the orifice 372 in check valve 371 to passage 373 leading to load piston 348. The load piston will be urged upwardly, compressing spring 347 and thus increasing the force urging spool 344 upwards which in turn requires a greater fluid pressure in chamber 349 to counteract the spring force and prevent annular opening 389 from closing. The pressure rise in chamber 349 is accompanied by a corresponding pressure rise in chamber 354 which increases the pressure in spring chamber 368 and accordingly in passage 373 leading to load piston 348 inducing even further compression of spring 347. Thus a gradual increase in pressure in passage 354 will occur as load piston 348 gradually moves upward until it reaches its limit and contacts valve spool 344. By the proper choice of spring 347 the resultant maximum pressure in passage 354, and thus in conduit 67, can be accurately predetermined. The final pressure which is achieved in conduit 64 can be set by the choice of spring 368. Since the output pressure in conduit 64 is to be less than the output pressure in conduit 67 (for example, 60 p.s.i. less) the combination of the force exerted by the lower pressure fluid plus the force exerted by spring 368 will be equal to the force tending to move valve spool 357 downward, when the conduit 64 pressure is the desired amount less than the conduit 67 pressure. Thus when the final pressure in passage 354 is reached and the final, and lower pressure, in passage 388 is reached the ports 363 will be open just sufficiently to supply makeup fluid to recess 387. In the event that there should be a drop in pressure in conduit 64 due to a leak or the like, ports 363 will open further with respect to recess 387 by virtue of valve spool 357 moving downward, until the pressure is again built up to that desired.

When there is a shift of gears either by changing one of the two speed clutches or one of the three range clutches, the pressure in the associated conduit leading thereto will drop as the newly selected clutch is filled. This will result in a drop in pressure in passage 373 enabling load piston 348 to move downward and require that the modulating cycle be started again. The poppet valve 381 in the safety reset valve provides a time delay in the response of that valve so that the time required for a normal shift will not be sufficient to enable the valve to move to its safety on position requiring a shift to neutral to reposition the safety valve from that shown in FIG. 20. Thus, a shift in gears is automatically accompanied by a modulated source of engagement pressure and without the necessity of first shifting to neutral. The pressure control valve unit provides two modulated sources of fluid pressure, one always a fixed value greater than the other. The unit also provides a safety feature requiring that the vehicle be shifted to neutral after any length of time has elapsed after a pressure drop has occurred (such as when the vehicle has been shut down).

REGULATING VALVES

Figure 5:
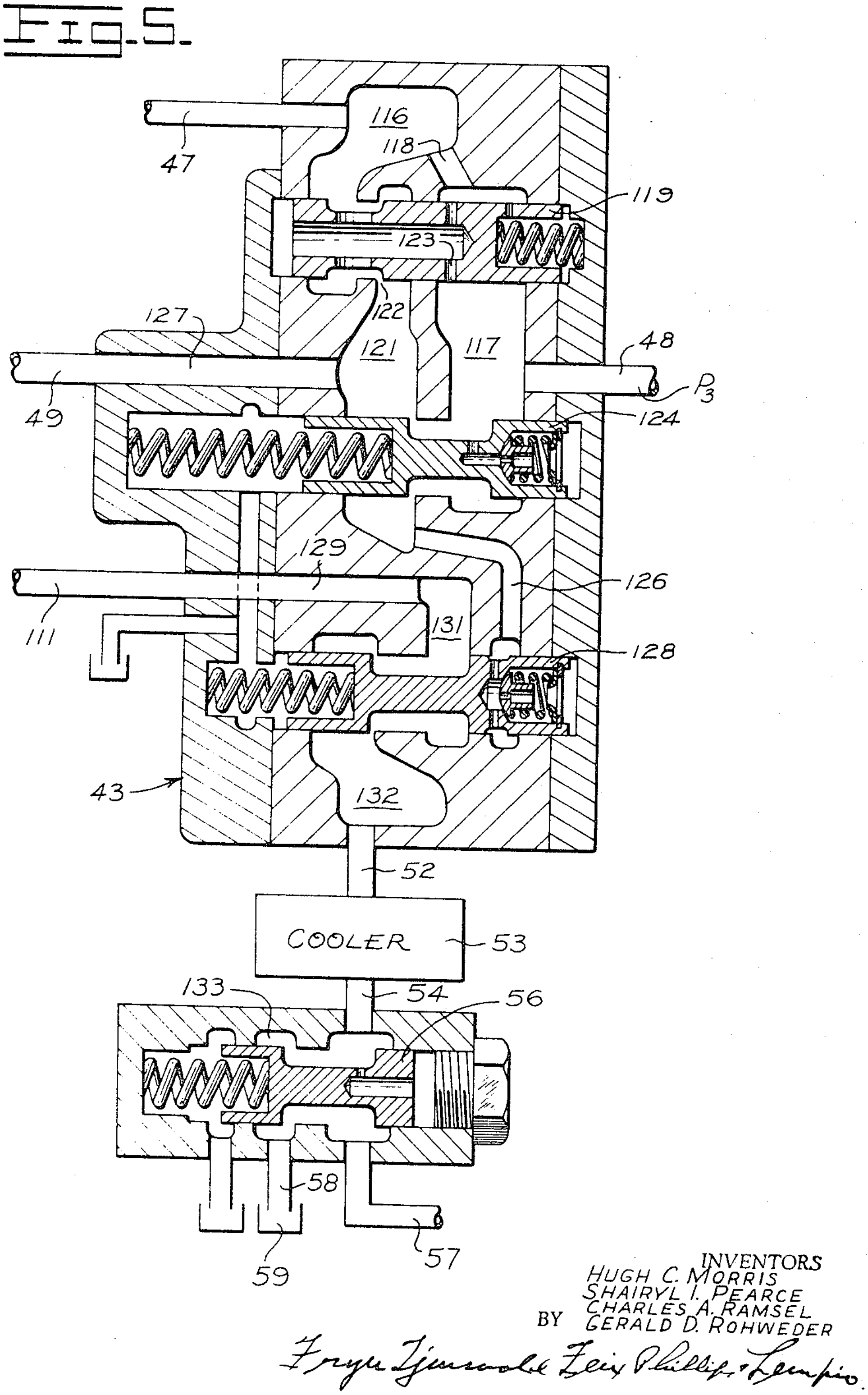
FIG. 5 is a schematic illustration in cross section of a regulating valve unit supplying the control system with regulated sources of fluid pressure.

Referring to FIGS. 4 and 5, fluid from pump 41 is delivered via conduit 47 to a compartment 116 in regulating valve unit 43. Compartment 116 communicates with a compartment 117 through a passage 118 and around a flow control valve 119. Compartment 116 further communicates with a compartment 121 through opening 122 by valve 119. The flow control valve restricts the flow between compartments 116 and 117 to a fixed quantity (for example, 25 g.p.m. whereas the flow from the pump may be 40 g.p.m.). Orifices 123 in valve 119 provide a second route for fluid from compartment 116 to enter compartment 117 and maintain the desired flow rate.

Compartment 117 supplies the main trunk line 48 with pressure regulated fluid thus requiring that the fluid in the compartment be maintained at a desired pressure $P_3$ (i.e., 410 p.s.i.). A relief valve 124 below compartment 117 is spring biased to open and release fluid to compartment 121 and passage 126 when the fluid pressure in compartment 117 exceeds the desired $P_3$ pressure. Compartment 121 which receives the excess flow from compartment 116 as well as the fluid relieved from compartment 117, communicates through passage 127 and conduit 49 with dump and fill valve 51, thereby supplying the torque converter and controls therefor with a source of working fluid. A second relief valve 128, below relief valve 124, controls the pressure in compartment 121 and connecting passage 126 by restricting flow from a compartment 131 to a compartment 132. The hydraulic torque converter system of the present invention operates satisfactorily at a pressure of 60 p.s.i. and thus relief valve 128 is designed to relieve fluid from compartment 131 when the pressure in passage 126 exceeds that desired level. When the front transmission is in torque converter drive, conduit 111 carries fluid from dump and fill valve 51 which passes through a passage 129 to compartment 131. In this manner the fluid in the torque converter is able to build up enough pressure to make it operative.

The excess fluid which is relieved by valve 128 enters a compartment 132 out of which it passes through conduit 52 to cooler 53 and conduit 54, to lubrication relief valve 56. Lubrication relief valve 56 is designed to maintain a source of low pressure fluid in an output conduit 57, as pointed out above. When the pressure in conduit 57 tends to exceed the lubrication pressure (e.g., 20 p.s.i.) relief valve 56 will move to the left forming communication between conduit 54 and annular recess 133 which communicates with sump 59 through conduit 58 thereby relieving fluid and thus the excess pressure.

The regulating valves are thus seen to provide a main trunk line source of regulated fluid pressure through conduit 48, a regulated source of fluid pressure for the torque converter through conduit 49, and a regulated source of low pressure lubrication fluid.

SPEED SELECTOR AND RANGE SELECTOR VALVE UNITS

Figure 6:
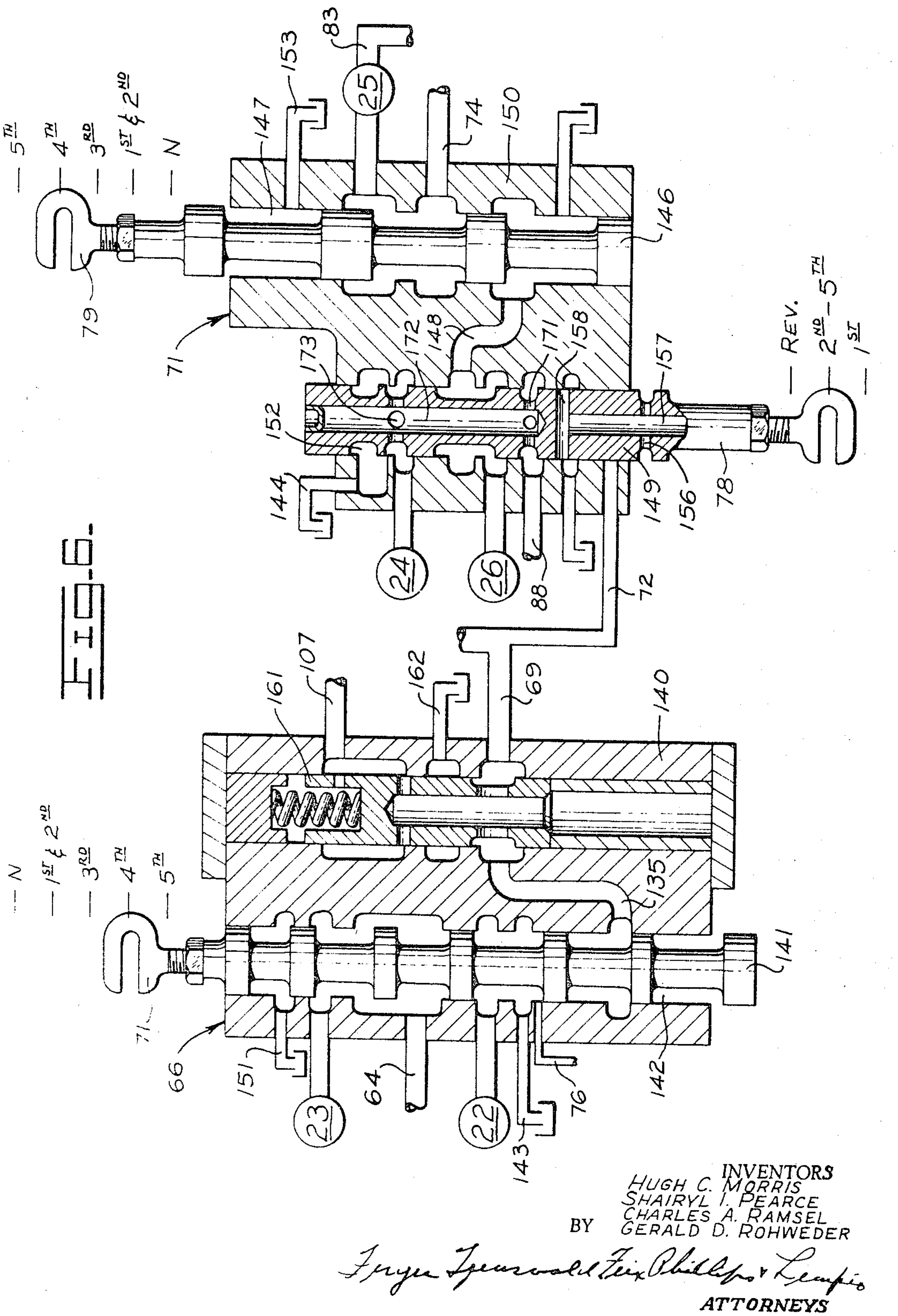
FIG. 6 is a schematic illustration in cross section of selector valves which determine the particular combination of gear actuating means which receive hydraulic actuating fluid.

Referring to FIGS. 4 and 6, speed selector valve unit 66 includes a speed selector valve spool 141 which is slidable in a valve bore 142 in valve body 140. Range selector valve unit 71 includes a range selector valve spool 146 and a directional selector valve spool 149, slidably disposed in valve bores 147 and 152, respectively, in valve body 150. Each of the aforementioned valve spools has a number of lands which cooperate with a number of recesses in their associated valve bores to direct pressure fluid to a selected clutch in a manner to be described.

FIG. 3, which illustrates the range transmission shift pattern, shows control lever 81 to have five vertical positions and three horizontal positions (as shown). Valve spools 141 and 146 are positionally dependent on the vertical position of control lever 81 while valve spool 149 is positionally dependent on the horizontal position of control lever 81. In a given horizontal position valve spool 149 is unaffected by vertical movement of control lever 81 and the positions of valve spools 141 and 146 are the same for a given vertical position of the control lever in each of the horizontal positions. The position of each of the selector valve spools for the various gears can be determined by reference to the scale illustrated adjacent the linkage hook end of each spool. As the scales indicate, spool 141 moves downward in response to downward movement of control lever 81 while valve spool 146 moves upward, and vice versa. When the control lever is moved from right to left spools 141 and 146 remain unchanged in position while spool 149 moves upward. Thus, movement of single control lever 81 is effective in positioning spools 141, 146 and 149 which direct fluid to the particular range transmission clutches which must be engaged to condition the gear train to the desired operating gear ratio, as signified by the numbers at the various control lever positions. As will be explained, the proper cross drive transmission clutches are also selected through control lever 81.

The two speed clutches 22 and 23 of range transmission 12 communicate with valve bore 142, to which a modulated source of pressure fluid is delivered via conduit 64 (see FIGS. 4, 20 and 21). In all positions except neutral, the pressure fluid from conduit 64 is directed to either clutch 22 or 23 depending upon the position of spool 141. The spool is shown in FIG. 6 in the position assumed when control lever 81 is in fourth gear. Reference to FIGS. 2 and 3 indicates that clutch 23 is to be engaged in fourth gear and thus a path is formed between conduit 64 and clutch 23, while clutch 22 is blocked from the source of fluid and communicated with dump line 143. If third gear were selected by control lever 81, spool 141 would assume a position upwardly of that illustrated and the pressure fluid would be directed to clutch 22 as FIGS. 2 and 3 indicate it should be. When spool 141 is in its extreme upward position, corresponding to a selection of neutral by lever 81, both clutches 22 and 23 are blocked from the source of fluid and drained through dump lines 143 and 151, respectively. Since power cannot be transmitted through transmission 12 without one of the speed clutches engaged, the power train is neutralized. When spool 141 is in the neutral position as just described, a passage 135 which is charged with pressure fluid, communicates with conduit 76, through bore 142 and provides the safety reset signal to control valve unit 63.

In addition to selector valve spool 141, valve unit 66 includes a flow control valve 161. This valve receives pressure fluid through communicating conduit 69 and delivers it at a controlled flow rate to torque divider selector valve 104 (FIG. 4) via conduit 107. The only time that fluid will flow in conduit 107 is when the front transmission is shifted from split drive to overdrive. At all other times conduit 107 will be blocked from clutch 21 or the clutch will be filled with sufficient pressure fluid so as not to require further flow. The valve is shown in FIG. 6 in the position it assumes when no flow is necessary in conduit 107. When the front transmission is shifted to overdrive, however, it will be necessary for fluid to flow in conduit 107, and valve 161 will move upward to dump part of the incoming fluid flow from conduit 69 into dump line 162 whenever the flow rate to conduit 107 exceeds a predetermined value. Thus, selector valve unit 104 is supplied with pressure fluid when it is necesary, and at a flow rate (e.g., 8 g.p.m.) which is suitable.

Range selector valve unit 71 includes valve spool 146 in valve bore 147 and valve spool 149 in valve bore 152 which combine to direct pressure fluid to one of the range clutches of the range transmission 12. The main source of pressure fluid to unit 71 is introduced to bore 147 through conduit 74 from control valve unit 63 (FIG. 4). When spool 146 is in the position assumed when control lever 81 is in either fourth gear (as illustrated), fifth gear or neutral, clutch 25 receives the incoming pressure fluid and is engaged. In all other gears, clutch 25 is blocked from source line 74 and drained through dump line 153 while the pressure fluid is directed to passage 148 leading to bore 152.

Fluid entering bore 152 from passage 148 will fill and engage either clutch 24 or 26 depending upon the position of the valve spool 149. When control lever 81 is positioned to select first, second, or third gear forward, clutch 26 will receive the pressure fluid (see FIGS. 2 and 3) while clutch 24 drains any pressure fluid it may have contained into dump line 144. When spool 149 is in its upwardly most position (corresponding to control lever 81 being in the reverse position) the pressure fluid will flow to clutch 24 (see FIGS. 2 and 3) while clutch 26 will drain to dump line 144 through openings 171, central chamber 172, and openings 173.

As mentioned in the discussion of the overall system, range selector valve unit 71 not only selects the range clutch of transmission 12, but is also effective in selecting the cross drive clutches which are engaged. Unit 71 performs this function hydraulically by providing a pressure signal in conduit 88 connected to bore 152. FIGS. 2 and 3 indicate that high ratio clutches 33 and 34 (see FIGS. 1 and 4) are engaged in all forward speeds except first. In first gear forward, and all reverse gears, low gear clutches 32 and 35 are engaged. Spool 149 has a central bore 157 having lower ports 156 and upper ports 158 which penetrate the valve spool. In the uppermost position of the spool (corresponding to control lever 81 being in the reverse column of FIG. 3) ports 156 are aligned with a conduit 72 carrying pressure fluid, thus enabling pressure fluid to flow into bore 157 and out of upper ports 158 into conduit 88. Conduit 88 leads to the upper portion of valve unit 84 (see FIG. 4) via branch conduits 89 and 91 and causes valves therein to be positioned such that the pressure fluid $P_1$ in conduit 97 is direct to clutches 32 and 35. A similar signal, giving rise to the same results, is provided when spool 149 is in its lowermost position (first gear forward) by virtue of communication between passage 148 and conduit 88 through bore 152.

In all gears in which clutch 25 is engaged a pressure signal will be directed through conduit 83 which is in connection with clutch 25. Conduit 83 leads to the lower portion of valve unit 84 (FIG. 4) via branch conduits 86 and 87 and a pressure signal therein acts on the same valves which are affected by a signal in conduit 88 but in a different manner. As will be discussed in detail below, the valves in unit 84 which respond to signals in conduits 83 and 88 have three positions: a neutral position, assumed when no signal is present in either conduit 83 or 88 (second and third gears forward); an up position, assumed when fluid pressure exists in conduit 83 (neutral, fourth and fifth); and a down position, assumed when pressure exists in conduit 88 (first gear forward, and all reverse gears). In both its up and neutral positions, pressure fluid $P_1$ is directed to clutches 33 and 34 (see FIGS. 2 and 3), while as explained above, in its down position clutches 32 and 35 receive the actuating fluid. Thus, the presence or absence of pressure fluid in conduits 83 and 88 determine which cross drive transmission clutches are engaged, while pressure in conduit 83 also provides a safety feature to be described in connection with vehicle steering.

STEERING PRESSURE CONTROL VALVE UNIT

Figure 7:
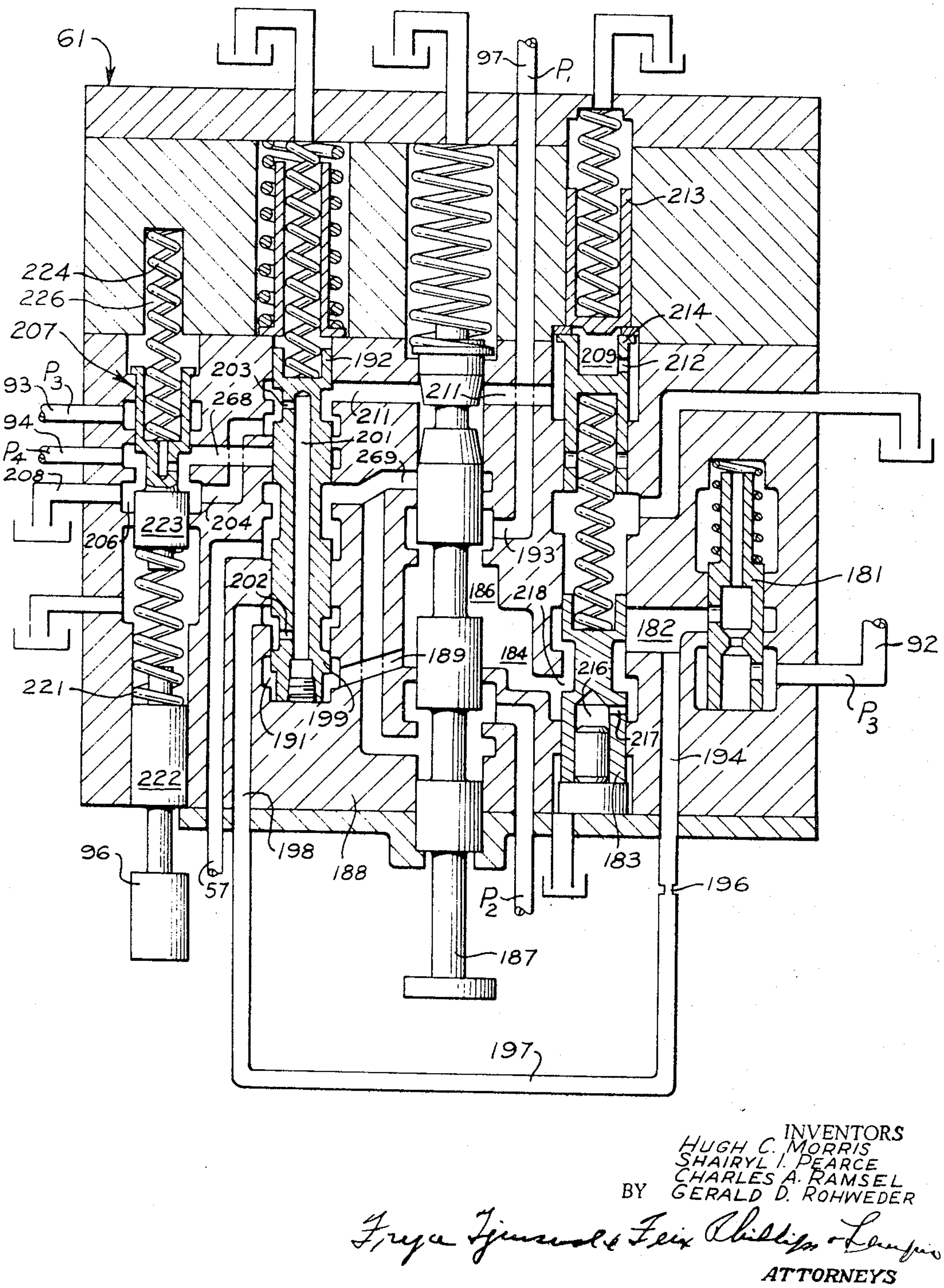
FIGS. 7, 8, 9 and 10 are schematic illustrations in cross section of the steering pressure control valve unit with its several components shown in the various positions they assume in response to steering wheel position and fluid pressure conditions.

FIG. 7 illustrates steering pressure control valve unit 61 with its various components in the positions which they assume when there is no fluid flow in the system. Conduit 92 provides a source of $P_3$ pressure fluid (when fluid flows in the system) to a flow limit valve 181 which communicates through a passage 182 with a modulating reducing valve 183. Valve 183 further communicates through a passage 184 with a chamber 196 which surrounds a portion of a selector valve spool 187 slidably disposed in valve body 188. A passage 189 leads from chamber 186 to the bore 191 of a check valve spool 192. As fluid is pumped into unit 61 it enters passage 182 at a fixed flow rate determined by valve 181 (e.g., 8 g.p.m.) and fills passage 184, chamber 186, passage 189 and the lower portion of valve bore 191. In all straight ahead driving conditions, valve selector spool 187 is in the position shown in FIG. 7, thus providing communication between a passageway 193 and chamber 186. Passage 193 leads to conduit 97 which provides the source of $P_1$ pressure to steering selector valve unit 84 (see FIG. 4). Thus, fluid entering chamber 186 will flow to the particular cross drive transmission clutches which have been selected and the pressure in chamber 186 will increase as the clutches become full.

At the same time that fluid flows from passage 182 to chamber 186, fluid also flows from passage 182 to valve bore 191 via passage 194, orifice 196, conduit 197 and passage 198. The fluid which enters valve bore 191 via this route is separated from that which enters the valve bore by way of passage 189 by land 199 on the check valve spool 192. The fluid entering valve bore 191 from passage 198 enters a central bore 201 in check valve spool 192 by way of orifice 202 and passes out of the central bore by way of a second orifice 203. With the various valve units in the position shown in FIG. 7 the fluid flowing out of orifice 203 communicates with a passage 204 which leads to the bore 206 of a brake valve 207 which is in turn in communication with a dump line 208. Thus, even though orifice 203 is also in communication with a chamber 209, by way of passage 211 and orifice 212, pressure is unable to build up in the chamber as long as the dump line 208 is in communication therewith.

Figure 8:
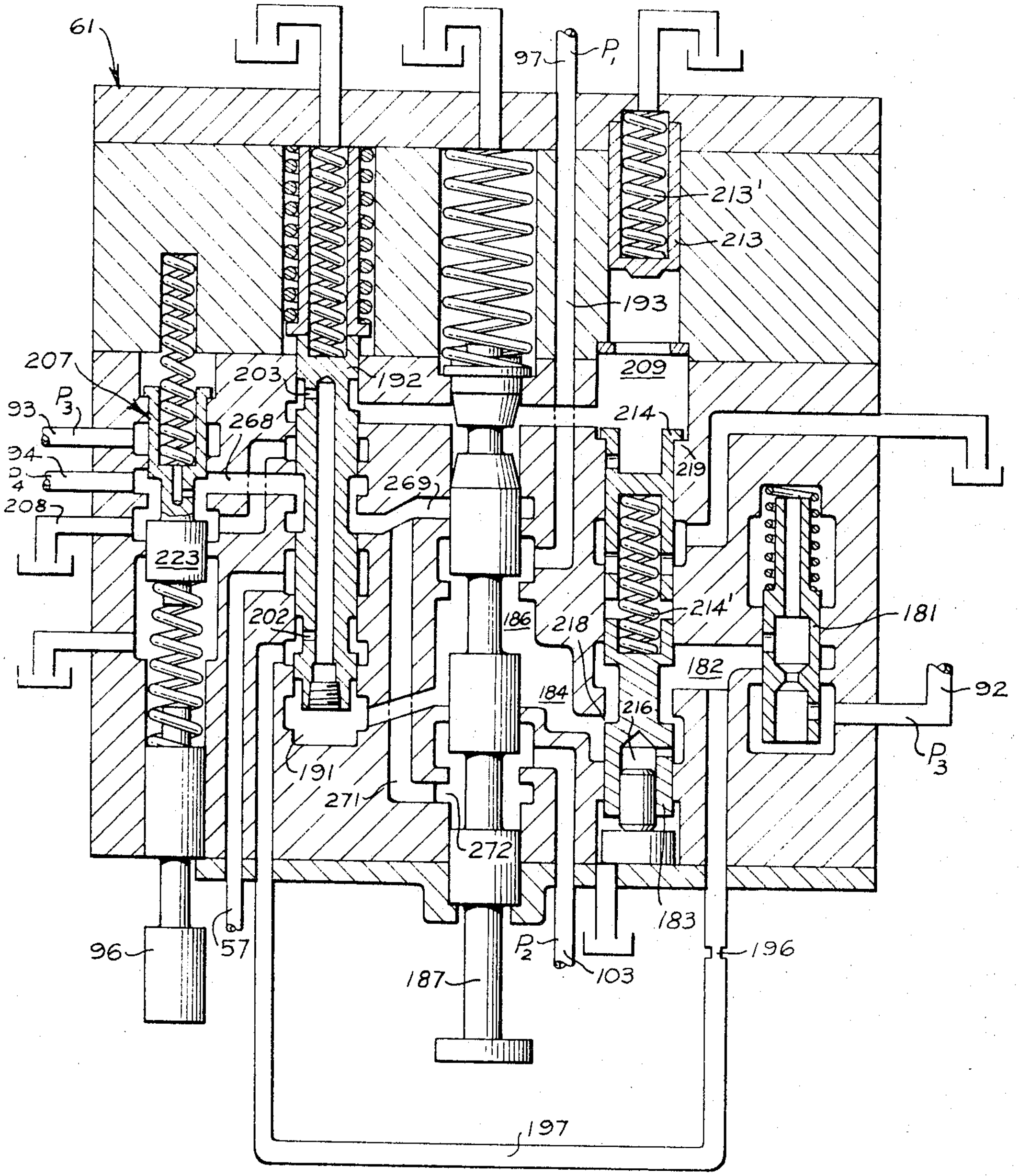

As the clutches fill and the pressure in chamber 186 begins to rise, however, a rise in the pressure of the fluid in the lower part of valve bore 191 will also occur so that check valve 192 will be urged upwardly, as shown in FIG. 8, causing the communication between orifice 203 and dump line 208 to be blocked. The communication between orifice 203 and chamber 209, however, is in no way affected and thus the fluid pressure in chamber 209 is able to rise. As the fluid pressure rises in chamber 209 a pair of load pistons 213 and 214 will be moved so as to compress their biasing springs 213' and 214', respectively. When the load pistons are in the position shown in FIG. 7 it requires very little pressure in chamber 216 of modulating reducing valve 183 (pressure being caused by fluid which enters via opening 217) to urge the valve upwardly decreasing the size of the annular opening 218 between passage 182 and passageway 184. As the load pistons are moved in opposition to their biasing springs, however, an increased force will be acting against modulating reducing valve 183 thereby requiring greater pressures in chamber 216 to restrict opening 218 in size. As the pressure builds up in chamber 216 it will also build up in chamber 186 and consequently in passageway 193 which is in communication with chamber 186. When load piston 214 is urged downwardly to the point where it contacts stop 219 the maximum desirable $P_1$ pressure will have been reached. Since the compression of valve spring 214' is gradual, the build up of pressure $P_1$ (pressure in conduit 97 leading to valve selector unit 84) will also rise gradually and thus be modulated in the manner desired for actuating fluid to a gear selecting means.

When a gear shift takes place in which the selected clutches of the cross drive transmission are changed from one set to another, the pressure in conduit 97 will drop as the newly selected clutches are filled with fluid and a similar drop in pressure will occur in chamber 186. A drop of pressure in chamber 186 is accompanied by a drop of pressure is the lower part of valve bore 191 allowing check valve spool 192 to drop down to the position shown in FIG. 7 In this position chamber 209 between the load pistons is communicated with dump line 208 thereby causing the pressure in chamber 209 to be reduced and the pistons to be returned to the positions shown in FIG. 7. As the newly selected clutch fills with fluid the pressure in it will begin to rise and the modulation cycle described above will take place.

Figure 10:
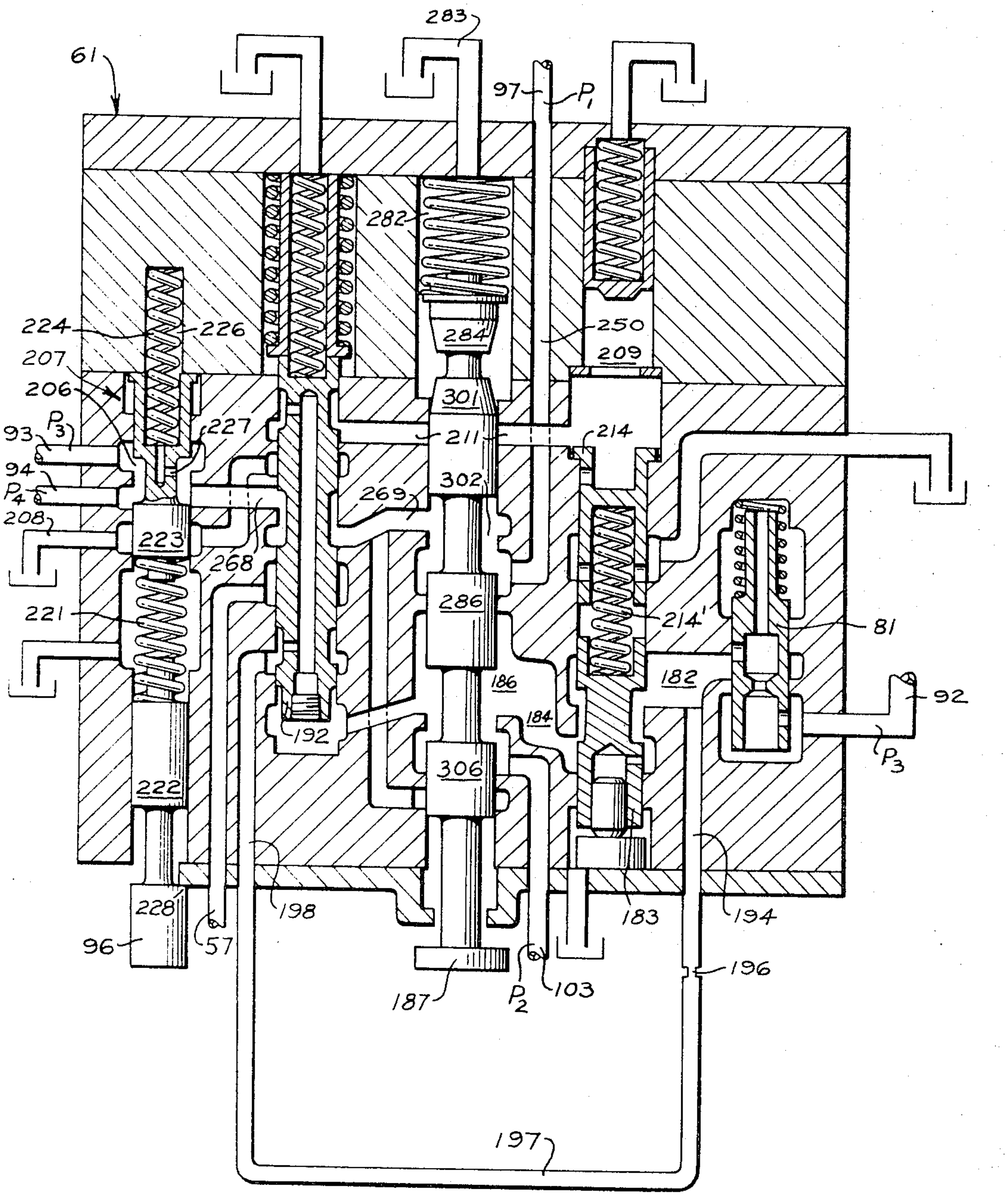

A second source of $P_3$ pressure is made available to valve unit 61 by conduit 93. A brake valve 207 determines the amount of this $P_3$ pressure (if any) which is allowed to be built up in conduit 94 to supply $P_4$ pressure to steering selector valve unit 84 (see FIG. 4). As pointed out above, lever 96 moves upwardly in response to brake pedal depression. This causes a spring 221 (FIG. 7) which seats on a piston 222 which is connected to lever 96, to compress. The other end of spring 221 seats on valve spool 223 which is spring biased downwardly by a biasing spring 224. The compression of spring 221 urges spool 223 upwardly against spring 224 as illustrated in FIG. 10. When spool 223 moves upwardly communication is formed between conduits 93 and 94 (through valve bore 206) thus providing braking fluid to selector unit 84. As the brakes fill with fluid and pressure rises in conduit 94, the pressure of the fluid which enters spring chamber 226 by way of orifice 227 will also rise providing an additional force urging spool 223 downwardly. When the force of the pressure fluid in chamber 226 plus the force of spring 224 is sufficient to counteract the additional force of compressed spring 221, spool 223 will be balanced, thus preventing a further build up of pressure in conduit 94. Should there be a drop in pressure in conduit 94 due to leakage or some other cause, valve spool 223 would momentarily move upward enabling sufficient fluid to enter conduit 94 to bring the pressure back up and then move downwardly once again. The equilibrium pressure in conduit 94 ($P_4$) is determined by the amount of force with which spring 221 acts against spool 223 which is dependent upon the amount which the spring 221 is compressed, which is dependent upon the amount which brake pedal 95 (FIG. 4) is depressed. Since the amount of braking which results is dependent upon the pressure of the fluid acting on the brakes, various degrees of braking are made available through valve 207. A stop 228 on lever 96 (FIG. 10) limits the extreme position of piston 222 so that the maximum pressure which can be established in conduitt 94, and therefore in the brake actuating means, is a pressure which can be applied with safety (e.g., 100 p.s.i. or lower).

Thus, steering pressure control valve unit 61 provides a modulated supply of pressure $P_1$ for the engagement of gear selecting clutches of the cross drive transmission as well as a source of brake engaging pressure $P_4$ the value of which is operator controlled. Steering pressure control valve unit 61 does provide an additional source of pressure $P_2$ through conduit 103 under certain conditions to be described.

STEERING SELECTOR VALVE UNIT

Figure 11:
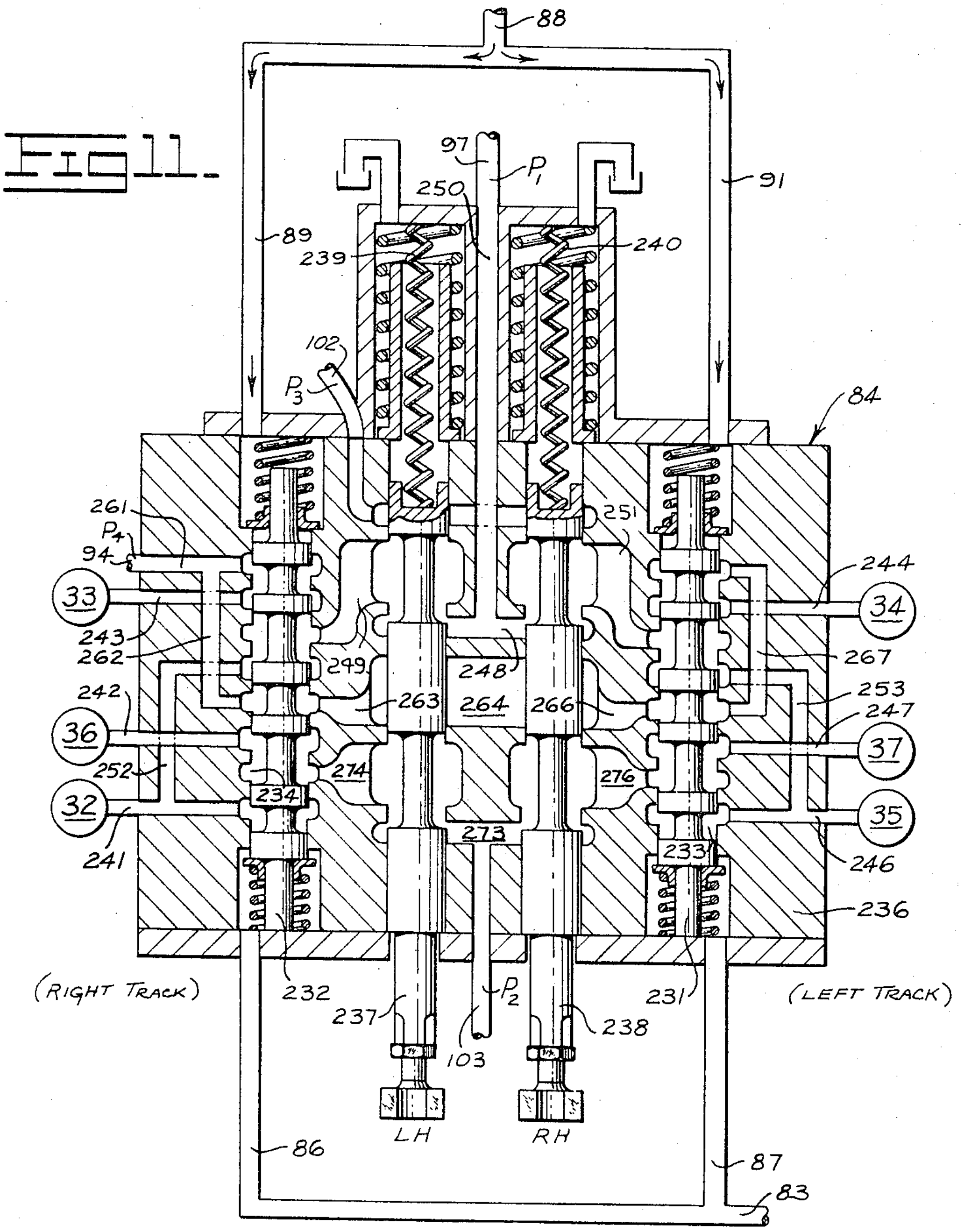
FIGS. 11, 12, 13, 14 and 15 are schematic illustrations in cross section of the steering selector valve unit with its components shown in the various positions assumed in response to steering wheel position and fluid pressure conditions.
Figure 12:
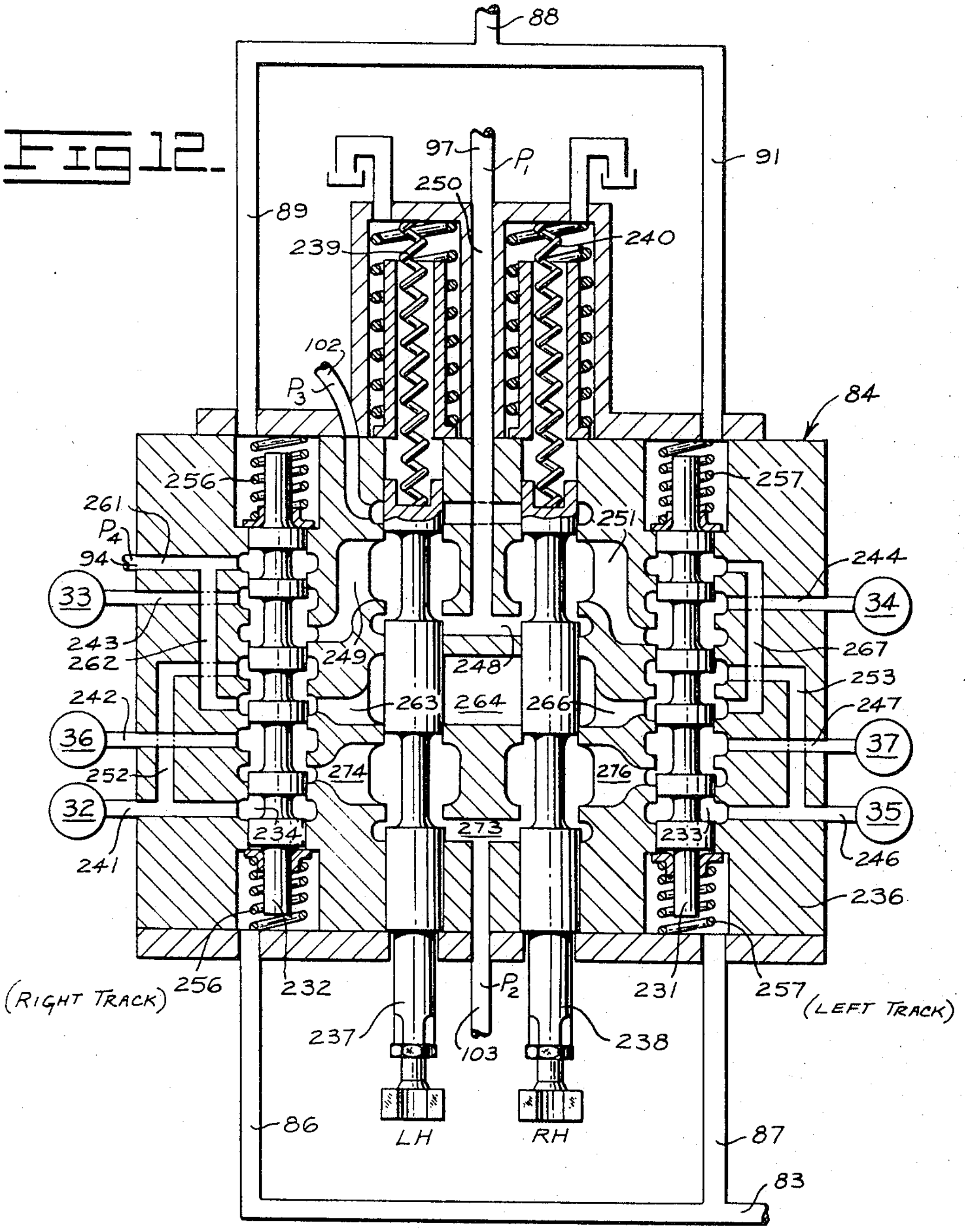
Figure 13:
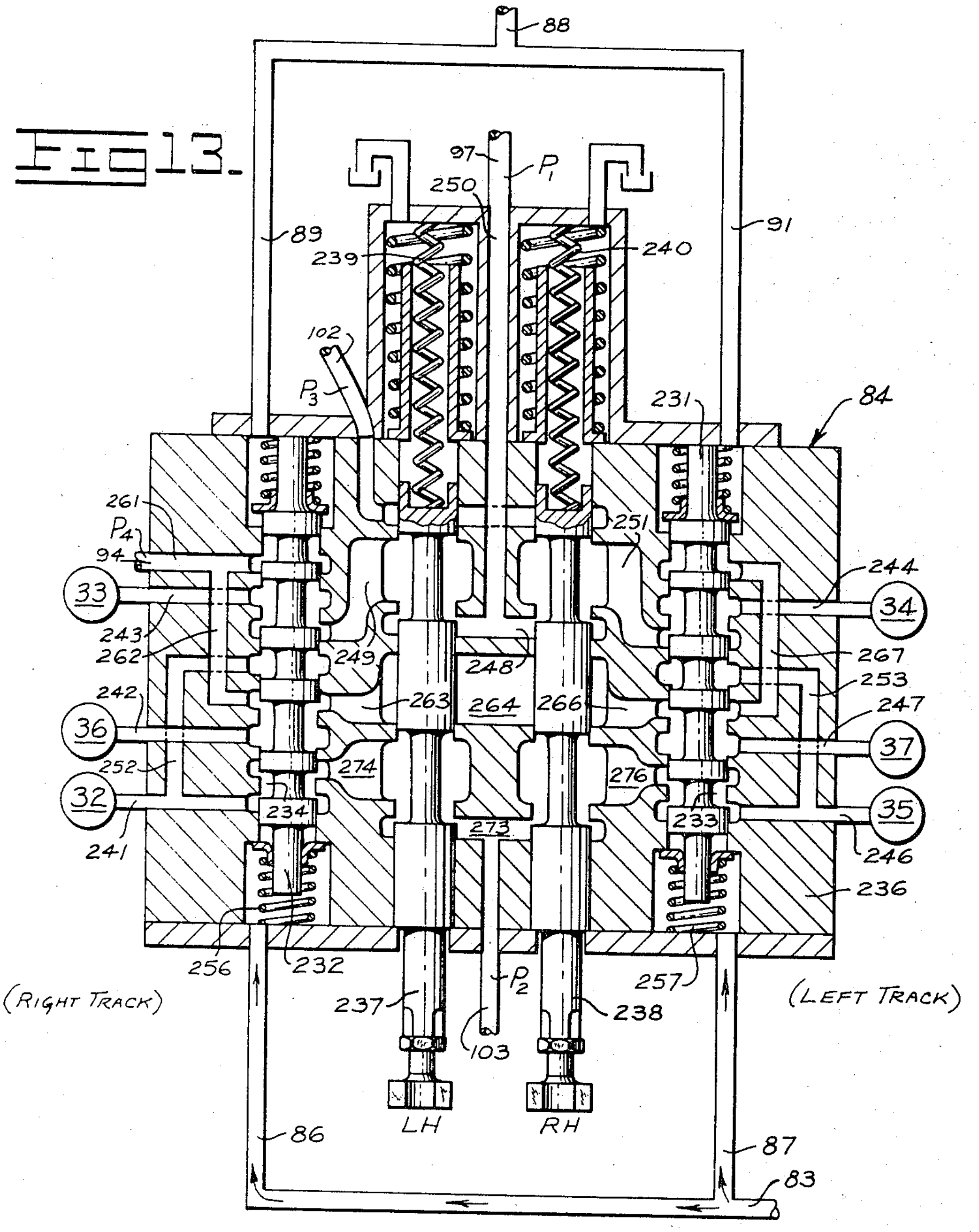

FIGS. 11, 12 and 13 illustrate steering selector valve unit 84 with its components in the various positions which they assume during straight ahead driving. FIG. 11 illustrates the components of unit 84 when the vehicle is being driven in first speed forward or any of the reverse gears. FIG. 12 illustrates the components in the positions they assume in second and third gears forward, while FIG. 13 shows the components in their positions when the power train is in either fourth or fifth speed forward. Referring to the above drawings, valve unit 84 comprises a pair of shuttle valve spools 231 and 232 slidably disposed within valve bores 233 and 234, respectively, in valve body 236. Between the shuttle spools there are disposed a left hand selector valve spool 237 and a right hand selector valve spool 238 which are spring biased to a downward position (as shown in FIGS. 11–13) by means of springs 239 and 240, respectively. The selector valve spools combine with various compartments and passages in valve body 236 to form various paths of communication between the bores of the shuttle spools. These paths are fixed and unaltered by a change in gears as long as the vehicle is being driven straight ahead. That is to say that selector valve spools 237 and 238 remain in the positions shown except when the vehicle steering wheel is rotated in which case one of the selector valve spools will be moved upward in a manner and for a purpose to be described below in connection with steering.

Clutches 32 and 33 along with brake 36 (associated with the right vehicle track) are in communication with shuttle valve spool bore 234 via passages 241, 242 and 243, respectively, while clutches 34 and 35 and brake 37 (associated with the left vehicle track) are in communication with valve bore 233 via passages 244, 246 and 247, respectively.

The $P_1$ pressure fluid carried by conduit 97 from steering pressure control valve unit 61 (FIGS. 4 and 7) enters a cross-passage 248 by way of passage 250. Cross-passage 248 resides between the two selector valve spools 237 and 238 and is in communication in one direction with a chamber 249 and in the other direction with a chamber 251. Chamber 249 is in communication with valve bore 234 so that $P_1$ fluid pressure entering unit 84 passes into cross-passage 248, through chamber 249, into valve bore 234 and into one of the clutches or brake associated with the right vehicle track. In the same manner, the fluid which flows from cross-passage 248 to chamber 251 is made available to valve bore 233 and thus to one of the clutches or brake associated with the left vehicle track depending upon the position of shuttle valve spool 231. As was discussed with reference to the speed and range selector valve units 66 and 71, the shuttle valve spools have three operating positions determined by the gear which has been selected by control lever 81.

FIG. 11 illustrates the shuttle valve spools urged to their down position by the hydraulic pressure signal from conduits 89 and 91 which are supplied with pressure fluid from conduit 88. Conduit 88 is charged with pressure fluid when the gear selecting control lever 81 is in either first gear forward or any of the reverse gears. Reference to FIGS. 2 and 3 shows that for the above mentioned operating gears the low gear ratio cross drive planetary clutches are to be engaged. Accordingly, the down position of spools 231 and 232 forms a path through the valve bore between chamber 249 and clutch 32 by way of passage 252, and between chamer 251 and clutch 35 via passage 253. At the same time that the above described communication is formed the remaining high ratio clutch and brake associated with each vehicle track is effectively blocked from the source of engaging pressure.

FIG. 12 illustrates the shuttle valve spools 231 and 232 in their neutral positions corresponding to the lack of a hydraulic signal in either conduit 88 or 83. The positions of the spools are thus set by the biasing springs 256 and 257. The neutral positions of the shuttle valve spools are assumed when the vehicle is driven in either second or third gear forward which, by reference to FIGS. 2 and 3, indicate that the high ratio cross drive clutches 33 and 34 are to be engaged. Accordingly, the $P_1$ pressure fluid flows in one direction from cross-passage 248 to chamber 249 and then to clutch 33 through valve bore 234 and passage 243, and in the other direction to chamber 251 from which the fluid flows to clutch 34 through valve bore 233 and passage 244.

Shuttle valve spools 231 and 232 are urged to their up position as shown in FIG. 13 when fluid pressure builds up in conduit 83 and thus in connecting conduits 86 and 87. Fluid pressure builds up in conduit 83 whenever clutch 25 is engaged which by reference to FIGS. 2 and 3 is seen to be neutral and fourth and fifth gears forward. Reference to these figures also shows that cross drive clutches 33 and 34 are to be engaged when fourth or fifth gear is selected and thus the flow path between cross-passage 248 and clutches 33 and 34 will be the same as when the shuttle valves are in their neutral position (see FIG. 12). Thus, there is actually no change in gears in the cross drive transmission when the veehicle is being driven straight ahead in any of the gears between second and fifth. The only change which occurs is that of a positioning of the shuttle valve spools and for a purpose which will be made clear in the description below relating to the steering of the vehicle.

The brake engaging pressure fluid, $P_4$, carried by conduit 94, enters a passage 261 in valve body 236. Passage 261 leads directly to the upper area of valve bore 234 and to the central area of the valve bore by way of branch passage 262 off of passage 261. As mentioned above, there are a number of paths through which valve bores 234 and 233 communicate during straight ahead driving conditions. One path which has been described is formed by chamber 249, cross-passage 248 and chamber 251, a second such path is formed by chambers 263, 264 and 266, which are successively in communication with one another in that order. Since chamber 263 is in communication with bore 234 and chamber 266 is in communication with bore 233, a fluid path between the bores is thus established. As is seen by reference to FIGS. 11–13, branch passage 262 which carries $P_4$ pressure whenever it exists, communicates through bore 234 with chamber 263 in all three positions of the shuttle valve spool 232. This, of course, means that whenever brake fluid pressure is introduced to valve unit 84 it will be introduced to valve bore 234 and then through the valve body to valve bore 233. Chamber 266 directs the fluid flowing therethrough to the central region of valve bore 233 so that a branch passage 267 which is formed between the central portion of bore 233 and the upper portion of the bore will also be charged with fluid and carry it to the upper portion of the bore so that the flow of braking pressure fluid will be the same in each of the shuttle valve spool bores. It is thus seen that regardless of the positions of the shuttle valve spools, $P_4$ pressure exists at all times in branch passages 262 and 267, and whether or not this pressure fluid is employed to engage a brake, or a clutch, or either, is dependent upon the particular position of the shuttle valve spools (and, of course, the existence of the $P_4$ pressure to begin with).

In the discussion of the overall system it was pointed out that the $P_2$ pressure which flows from the steering pressure control valve unit 61 to steering selector valve unit 84 by way of conduit 103 is used in some circumstances to supply braking pressure and in some circumstances to aid in steering. Reference to FIG. 8 shows that when the vehicle is being steered straight ahead communication will exist between $P_4$ pressure line 94 and $P_2$ pressure line 103 via passages 268, 269 and 271 and chamber 272. Thus, the pressure $P_2$ and the pressure $P_4$ will be the same.

Referring first to FIG. 11 (shuttle valve spools in their down postion), the introduction of fluid pressure $P_4$ is seen to result in the engagement of clutches 33 and 34 while the $P_2$ fluid pressure enters cross-passage 273 from which it flows in opposite directions to chambers 274 and 276 which are in communication with bores 234 and 233, respectively. With the shuttle valve spools in their down position communication exists between brake 36 and chamber 274 through valve bore 234, and between brake 37 and chamber 276 through valve bore 233. Thus, the depression of the brake pedal 95 (FIG. 4) results in the establishment of a $P_4$ pressure (the magnitude of which is dependent upon the amount of brake pedal depression) which in turn gives rise to a $P_2$ pressure of the same magnitude, during straight ahead driving operation. Thus, when the brake is applied with the vehicle operated in either first speed forward or a reverse speed (in which cases the low ratio clutches are engaged in the cross drive transmission) the effect of the establishment of the braking pressure is the engagement of the high ratio clutches of the cross drive transmission as well as the brakes thereof. When the shuttle valve spools are in their neutral position as shown in FIG. 12, the establishment of brake pressure $P_4$ results in the engagement of the unengaged low ratio gear clutches by virtue of the communicating paths between conduit 94 and clutches 32 and 35. And as in the previously described situation the brakes 36 and 37 are engaged by virtue of the $P_2$ pressure supplied through conduit 103 which communicates through the associated valve bores of the brakes. Thus, the result of braking is to have all six hydraulically actuated elements of the cross drive transmission engaged.

When the shuttle valve spools are in their up position as shown in FIG. 13, the high ratio clutches 33 and 34 are engaged, as described above, and it is thus desirable to engage brakes 36 and 37 and low ratio gear clutches 32 and 35 by the braking pressure. Thus, brakes 36 and 37 are supplied with pressure $P_4$ while low range clutches 32 and 35 receive the $P_2$ pressure. It may be noticed that the fluid pressure which engages the brakes 36 and 37 when the shuttle valve spools are in their neutral position is the $P_2$ pressure and when they are in their up position it is the $P_4$ pressure. There is, however, really no difference in operation since, as described above, the $P_2$ and $P_4$ pressures are identical during the straight ahead operating conditions. Thus, in summary it can be said that the braking of the vehicle for the purposes of bringing it to a stop or slowing it down is accomplished not only by engaging the brakes of the cross drive transmission but also by the engagement of the disengaged clutches.

VEHICLE STEERING

Vehicle steering is accomplished through the manipulation of several of the components of the previously described steering pressure control valve unit 61 and steering selector valve unit 84. The vehicle steering has two major conditions—that which occurs when the steering wheel is turned one-half way to full turn and that which occurs when the steering wheel is rotated a full turn. Thus, the discussion which follows shall be divided into these two conditions.

*Steering wheel turned one-half way to full turn*

Figure 9:
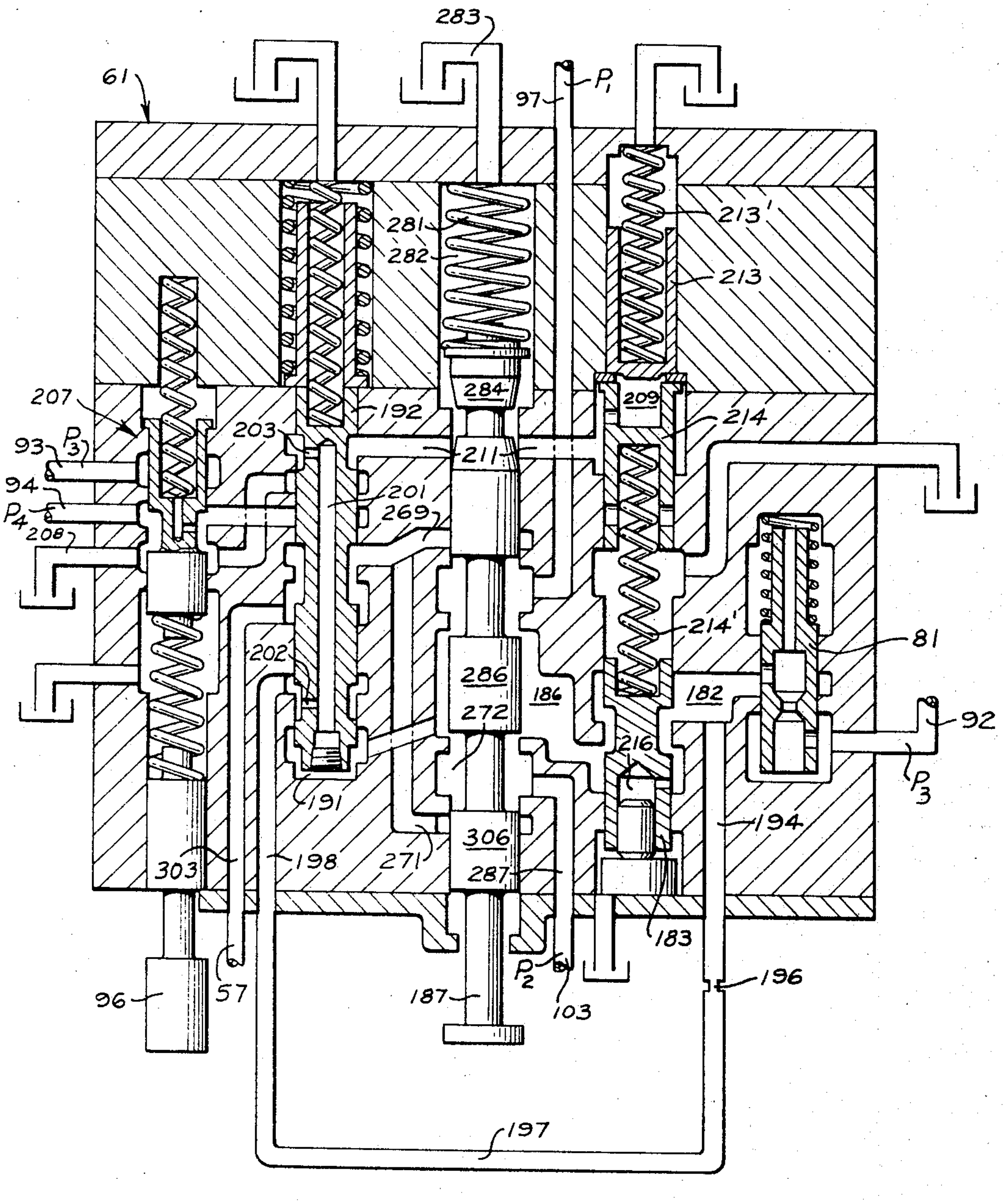

Referring to FIG. 9, selector valve spool 187 responds to a half turn of the vehicle steering wheel by moving upwardly against its biasing spring 281, and in so doing forms an annular opening between passage 211 and biasing spring chamber 282 which is itself in communication with a dump line 283. The annular opening past land 284 of selector valve spool 187 causes the pressure in chamber 209 between load pistons 213 and 214 to gradually drop and thus allow biasing springs 213' and 214' to urge the load pistons toward each other. The upward movement of selector valve spool 187 also creates an annular opening past land 286 between chamber 186 and chamber 272. Thus, the lack of force against valve spool 183 by spring 214' will enable a relatively low pressure in chamber 216 to move the spool upwardly and prevent further fluid flow into chamber 186. The fluid which flows from passage 182 through passage 194, orifice 196, conduit 197, passage 198, and on through check valve 192 to chamber 209 between the load pistons will not be effective in compressing spring 214' so as to modulate the pressure in chamber 186 since pressure build up in chamber 209 is prevented by the communication of connecting passage 211 with dump line 283. The communication formed between chambers 186 and 272 enables fluid previously held at a high pressure in chamber 186 to flow into passage 287 leading to conduit 103 which delivers $P_2$ pressure to the steering selector unit. Thus with the steering wheel in this position the $P_1$ pressure which normally engages the selected cross drive transmission clutches will be reduced and a source of $P_2$ pressure will be established having the same magnitude as the $P_1$ pressure. While the foregoing discussion of the affect of steering wheel rotation on the steering pressure control valve unit 61 and more particularly the selector valve spool 187 thereof is descriptive of steering wheel rotation either to the right or the left, a description of what takes place in the steering selector valve unit 84 in response to steering wheel rotation depends upon which direction the steering wheel is rotated. Thus, the following description will be made with reference to steering wheel rotation to the right, but with the thought in mind that the system operates in essentially the same manner for a similar type turn to the left, except that the pressure to the clutches and brakes on the other track will be modulated.

Figure 14:
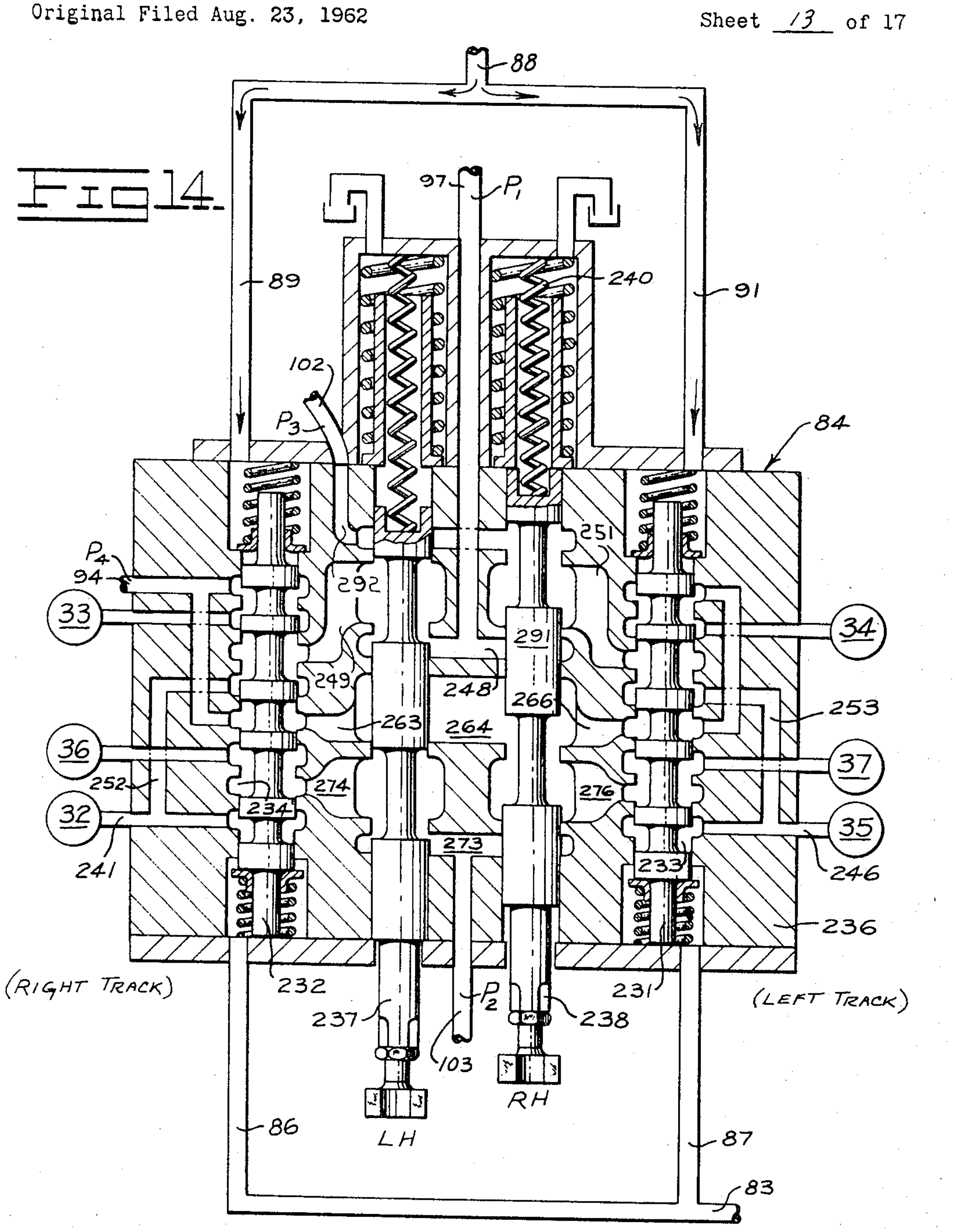

Referring now to FIG. 14, the shuttle valve spools 231 and 232 are in the position they assume when the power train is in first gear forward; in which case low gear ratio clutches 32 and 35 are engaged by the $P_1$ pressure supplied from conduit 97 and passing through chamber 249. When the steering wheel is moved a half turn to the right, righthand selector valve spool 238 moves upwardly against its biasing spring 240 which results in cross-passage 248 being blocked by land 291 from communication with chamber 251. Thus, the $P_1$ pressure is unable to reach shuttle valve spool bore 233. Communication between passage 248 and chamber 249 is unaffected, however, thus enabling the $P_1$ pressure to enter shuttle valve bore 234 and low ratio gear clutch 32 via passages 252 and 241. The $P_1$ pressure, however, as discussed above, is greatly decreased (from approximately 300 p.s.i. to something below 100 p.s.i.) from the value which it had prior to the rotation of the steering wheel. The $P_2$ pressure entering valve unit 84 by way of conduit 103 passes from cross-passage 273 to chamber 274 which is in communication with valve bore 234. The upward movement of righthand selector valve spool 238 blocks the communication between cross-passage 273 and chamber 276 so that the $P_2$ pressure is not received by shuttle valve spool bore 233. There is communication between brake 36 and chamber 274 through valve bore 234 and thus the brake associated with the righthand track of the vehicle will be engaged with a pressure $P_2$ equal to $P_1$ which, as stated above, is reduced to something less than 100 p.s.i. Thus, the effect on the clutches and brake associated with the vehicle track which is on the inside of the turn is the engagement of the clutch engaged prior to turning the steering wheel but with less pressure thus allowing a certain amount of slippage, while the brake associated with that track is engaged with a pressure equal to the pressure engaging the clutch.

The vehicle track on the outside of the turn (in this example the lefthand vehicle track) must be driven preferably at the same gear and in the same manner as it was prior to the steering wheel having been rotated. Since the $P_1$ pressure which previous to the turning of the steering wheel engaged clutch 35 is reduced in pressure, it is necessary to supply clutch 35 with another source of pressure if it is to be maintained in the same engagement. For this purpose, a source of main trunk line pressure $P_3$ is provided to the unit 84 through conduit 102. As can be seen with reference to FIGS. 11–13 conduit 102 delivers fluid to valve unit 84 but has no effect on the components when the vehicle is being driven straight ahead as the selector valve spools 238 and 237 prevent the $P_3$ fluid pressure from entering the shuttle valve spool bores. Referring again to FIG. 14, the upward movement of righthand selector valve spool 238 enables the $P_3$ pressure in conduit 102 to enter chamber 251 by way of passage 292. The lefthand selector valve spool 237 being unchanged in position still prevents the $P_3$ pressure from entering chamber 249. The $P_3$ fluid pressure entering chamber 251 follows the same path as did the $P_1$ pressure prior to rotation of the steering wheel and thus engages low ratio gear clutch 35 via shuttle valve bore 233, passage 253 and passage 246.

Thus, the rotation of the steering wheel half way to a full turn results in the reduction of $P_1$ pressure, the introduction of a $P_2$ pressure to the brake associated with the track on the inside of the turn and the introduction of a supplementary $P_3$ pressure to maintain engagement of the previously engaged low range clutch (or high range clutch if the vehicle were traveling in a gear in which the high range clutch were engaged). This same sequence of events occurs for a turn executed by rotating the steering wheel half of a turn, regardless of the particular gear in which the power train is being operated. The various clutches and brakes to which the $P_2$, $P_3$ and $P_1$ pressures are directed, however, vary depending upon the particular gear in which the vehicle is being operated when the turn is executed. Rather than illustrate what occurs for each operating gear it will be simpler merely to refer to FIG. 19 where a complete chart showing the use of the cross drive clutches is set out. The extreme lefthand column of the clutch sets for the gear of operation while the various operating conditions are set forth at the top of the chart. Each of the gears which are indicated as being engaged for a given gear and set of conditions have a subscript *a*, *b*, or *c*; *a* signifies a pressure to that clutch or brake of 410 p.s.i., *b* indicates a pressure of 300 p.s.i., and *c* indicates a pressure of less than 100 p.s.i. (it being understood, of course, that these pressures are merely exemplary of the system being discussed and in no way limiting on the invention). Thus, the situation described above was a righthand turn with a half turn of the steering wheel while the vehicle was traveling in first gear forward. The turn was executed without the use of the brakes and thus the chart indicates that the portion of the cross drive transmission associated with the left track receives actuating pressure at clutch 35 and the pressure is of the *a* type (410 p.s.i., $P_3$). The chart next indicates that the portion of the cross drive transmission associated with the right vehicle track has clutch 32 and brake 36 engaged by means of *c* type pressure (less than 100 p.s.i.). These, of course, are exactly the clutches which were discussed above as receiving actuating pressure fluid. The pressure chart at the lower portion of FIG. 19 indicates the values of the various pressures $P_1$ through $P_4$ for the conditions set out at the top of the cross drive clutch chart. Once again referring to the last discussed condition, namely the vehicle traveling in first gear forward and being turned to the right without the use of brakes, it will be noted that the $P_1$ pressure is less than 100 p.s.i., the $P_2$ pressure is less than 100 p.s.i., the $P_3$ pressure is 410 p.s.i. and the $P_4$ pressure is equal to zero. Referring back to the discussion with reference to FIG. 14 will show that these were the exact pressures which were indicated as being employed. Thus, FIG. 19 gives a complete chart of the use of cross drive clutches, making it unnecessary to describe the exact operation under all conditions and at each possible gear ratio. The system operates as described above in all gears, only the engagement means receiving fluid changes.

In connection with braking while steering, reference to FIG. 9 shows that the communication which exists between passageway 287 containing $P_2$ pressure and conduit 94 carrying $P_4$ pressure is blocked during steering so that the depression of the brake pedal 95 and the corresponding upward movement of lever 96 produces a braking pressure $P_4$ in conduit 94 without a similar pressure being established in the $P_2$ conduit 103. Referring to FIG. 14 and the chart of FIG. 19, the application of the brakes and the corresponding build up of $P_4$ pressure in conduit 94 results in the engagement of those clutches and brakes of the cross drive transmission which were not engaged previous to the brake pedal depression. These remaining clutches and brakes are engaged with a *c* pressure (less than 100 p.s.i.) so that the vehicle can be slowed during a turn without disrupting the curved path which it is following.

*Steering wheel rotated to full turn*

Figure 15:
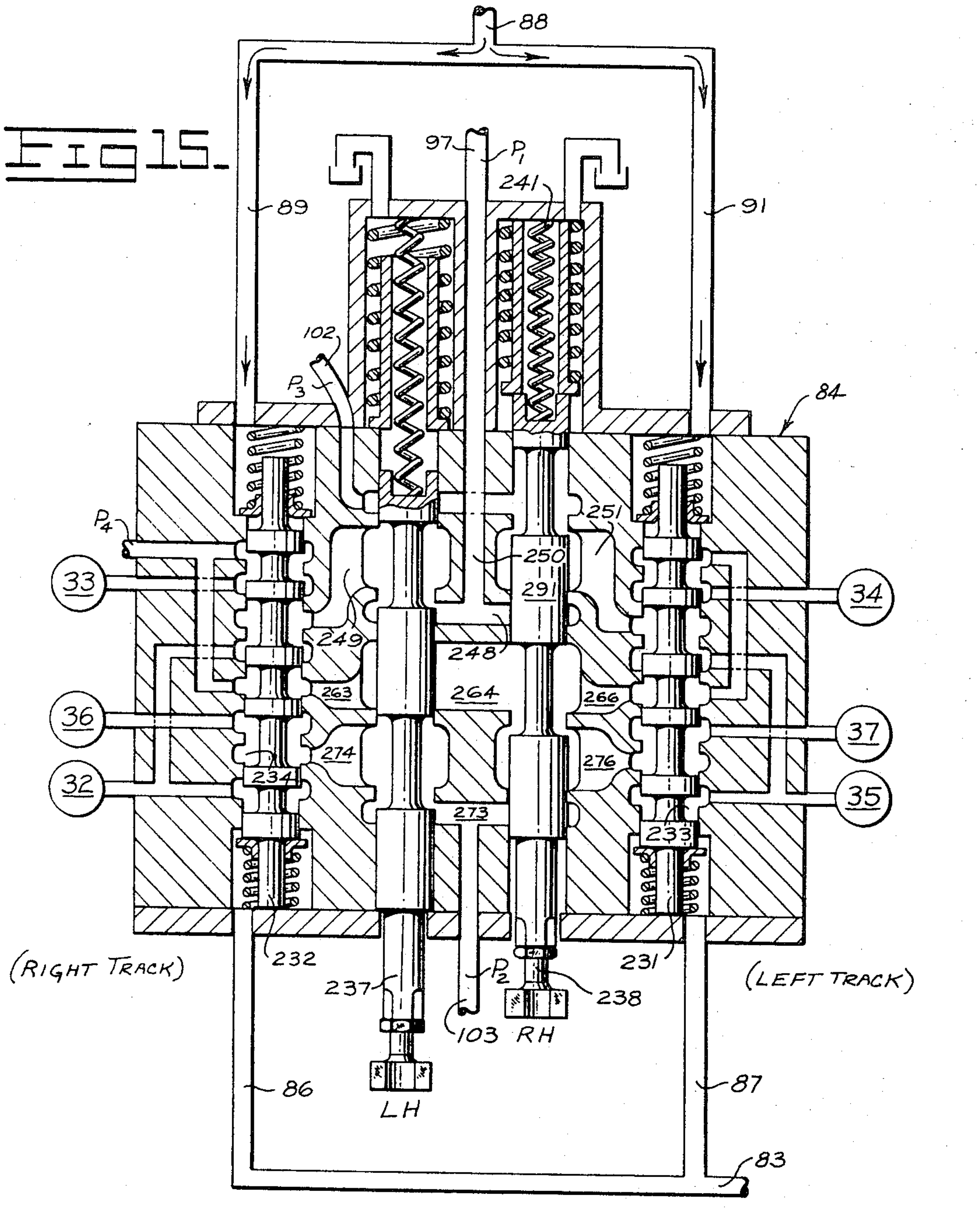

As the steering wheel is turned at a moderate rate of speed from the half turn position shown in FIG. 9 to the full turn position shown in FIG. 10, the annular opening between passage 211 and spring chamber 282 is gradually closed by tapered land 301 enabling the pressure in chamber 209 to once again build up. The $P_1$ pressure line 97 is completely separated from chamber 186 by land 286, while the $P_2$ pressure in conduit 103 is gradually increased as the valve spring 214' is gradually compressed. FIG. 15 illustrates the position of the righthand selector valve spool 238 when the steering wheel has been fully rotated and while it is seen to be in an extreme upward position as compared to that of FIG. 14, the passages which are available for the flow of $P_2$ pressure and $P_3$ pressure are nonetheless maintained essentially the same as they were in the half turn position of the steering wheel. Thus, the $P_1$ pressure has been reduced to zero completely disengaging the low range clutch 32 while the low range clutch 35 is maintained in engagement by the $P_3$ pressure from conduit 102 and the brake 36 associated with the right track is supplied with a modulated source of $P_2$ pressure from conduit 103. Reference to the chart of FIG. 19 shows that for the condition in which the power train is in first gear and the steering wheel is fully turned to the right and the brakes are not applied, the lefthand track has clutch 35 engaged with *a* pressure (410 p.s.i.) while the righthand track has brake 36 engaged with *b* pressure (300 p.s.i.). The particular clutch or brake associated with the other track which will be engaged in response to a full turn of the steering wheel in any particular gear can be found on the chart of FIG. 19 and the manner in which these gears are selected is obvious from reference to the drawings and the discussion above.

The positioning of selector valve spool 187 to its extreme upward position (see FIG. 10) not only closes the opening between passage 211 and chamber 282 but also creates communication between the $P_1$ passageway 250 and the $P_4$ conduit 94 via passageway 268, passageway 269 and chamber 302. Thus, the application of brake pedal 95 results not only in the establishment of pressure $P_4$ in conduit 94 but also a pressure of the same magnitude in conduit 97 which carries $P_1$ pressure. Providing $P_1$ and $P_4$ pressures to valve unit 84 when steering wheel 100 is rotated a full turn (see FIG. 15) results in pressure being established in clutches 33 and 32 as well as in clutch 34 and brake 37. Thus, while before the brakes were applied clutch 35 was engaged with *a* type pressure and brake 36 was engaged with *b* type pressure, after the depression of the brake pedal, all of the remaining elements (both clutches and brakes) which were not engaged, are engaged with *c* type pressure through the connecting paths shown. Some of the clutches receive their pressure from the $P_1$ source and some from the $P_4$ source but in this particular instance it makes no difference since both the $P_1$ and the $P_4$ sources are of identical pressure value. The engagement of all disengaged clutches and brakes by the depression of the brake pedal 95 when the vehicle is being steered with a full turn of the steering wheel is true in all gears as the chart of FIG. 19 indicates. The particular paths followed by the $P_1$ and $P_4$ pressure in engaging the disengaged clutch by depression of brake pedal 95 can be easily worked out from the various figures and will thus not be presented in detail.

A different type of turn can be achieved by rotating the steering wheel in a relatively fast, quick manner than can be achieved by rotating it at a smooth, moderate speed. The operation giving rise to this difference can best be seen by reference to FIG. 9. Conduit 57 which is charged with low pressure lubricating fluid supplies passageway 303 in valve unit 61 with a source of low pressure fluid. As selector valve spool 187 is slowly urged upwardly by a moderate speed turn of the steering wheel, a passageway 271 which communicates through passage 269 and valve bore 191 with passageway 303, will communicate with chamber 272 and thus passage 287 before land 286 creates communication between chambers 186 and 272, but after land 284 provides an opening between passage 211 and chamber 282. Thus, when land 284 moves upward sufficiently to relieve the pressure in chamber 209 check valve 192 will move downward providing communication through its valve bore between passages 303 and 269 through which the low pressure lubrication fluid will flow in reaching chamber 272 which will not as yet have been opened to chamber 186 or blocked from passage 271 by land 306. Thus, an initial source of fluid pressure $P_2$ will be supplied to the inside brake before the higher pressure from chamber 186 is delivered through conduit 103. This will furnish an initial, low value engagement pressure giving rise to a decrease in delay time for initially filling the brakes. If, on the other hand, the selector valve spool 187 is moved upwardly with a sharp, fast movement as would be caused by a fast rotation of the steering wheel, the $P_2$ pressure would immediately assume the pressure of chamber 186 which would drop momentarily due to an empty clutch requiring filling (see FIG. 15) but which would immediately begin its modulation cycle and thus prevent the source of $P_2$ pressure from the initial benefit of the low pressure lubricating fluid presented by conduit 57.

As indicated on the chart of FIG. 19, a full turn of the steering wheel in either fourth or fifth gear does not result in the engagement of either of the brakes of the cross drive transmission. This is a safety feature which prevents the vehicle from being turned too sharply at too fast a speed, which could result in skidding or vehicle rolling. It is altogether possible, however, that the vehicle while operated in fourth or fifth gear would be driven at only partial throttle and thus traveling at a sufficiently low speed to make a relatively small radius turn both safe and desirable. Mechanical brake levers 36*a* and 37*a* (see FIG. 1) are provided for this very purpose. When the operator wishes to apply the brake of one track without that of the other in a gear in which steering wheel rotation does not give rise to this action, he may accomplish it by depressing a brake pedal or some other manually operated means and thereby engage the desired brake.

Thus, it is seen that the steering pressure control valve unit 61 and steering selector valve unit 84 together provide a system giving rise to a wide choice of conditions which the cross drive transmission can be set in and thus enable an operator to accurately maneuver his vehicle in the precise manner which is called for by the conditions existing at the moment. One of the outstanding features of the invention is the manner in which the single steering pressure control valve unit 61 provides a modulated source of fluid pressure to the clutches and brakes on both sides of the cross drive transmission. A further outstanding feature is the cross modulation which occurs during a turn. As a turn is being executed a clutch on one side of the transmission is gradually disengaged while the other clutch or brake on the same side is gradually engaged until the desired final engagement pressures are achieved. This provides for smooth operation which prevents abrupt turning that could be very dangerous under many conditions in which such a vehicle would be operating. It also prevents power losses which would otherwise result. The graph of FIG. 18 shows that at zero steering wheel rotation (steering straight ahead) either the high or low clutches of the cross drive transmission are engaged with a pressure of approximately 300 p.s.i. (again as before, only an exemplary figure). As the steering wheel is slowly turned the pressure in chamber 209 between the load pistons 213 and 214 (see FIG. 8) is gradually reduced by fluid escaping past tapered land 284 (see FIG. 9). When the steering wheel has been turned approximately one-quarter of a turn a very low pressure will be established in the $P_2$ conduit (lube pressure of approximately 20 p.s.i.) and delivered to the low ratio clutch or brake (depending upon which gear the vehicle is being operated at the time the turn is being executed) on the same side as the clutch which is having its engagement pressure reduced. At the half turn point as explained in detail above, the clutch and brake or two clutches, whichever the case may be, are engaged with the same pressure; something less than 100 p.s.i. As the steering wheel is rotated beyond the half turn and toward the full turn point, the communication between chamber 209 between the load pistons and chamber 282 which leads to dump line 283 (see FIG. 9) is slowly reduced thus enabling the pressure in chamber 209 to increase which results in an increase in the pressure in chamber 186 with a corresponding increase in pressure $P_2$ to the low gear or brake. When the steering wheel has been turned approximately three-quarters of the way to a full turn the $P_1$ pressure will drop completely to zero, no lube pressure will be presented to the high or low cross drive clutch and the $P_2$ pressure will continue to rise until the final pressure of approximately 300 p.s.i. is attained. Thus, while one side of the cross drive transmission is maintained in the operating gear in which it was driven while the vehicle was being driven straight ahead, the other side of the cross drive transmission is cross modulated so that the engagement pressure to one clutch is gradually reduced while the engagement pressure to the other clutch or brake is gradually increased.

TORQUE DIVIDER SELECTOR VALVE AND DUMP AND FILL VALVE

Figures 16, 17:
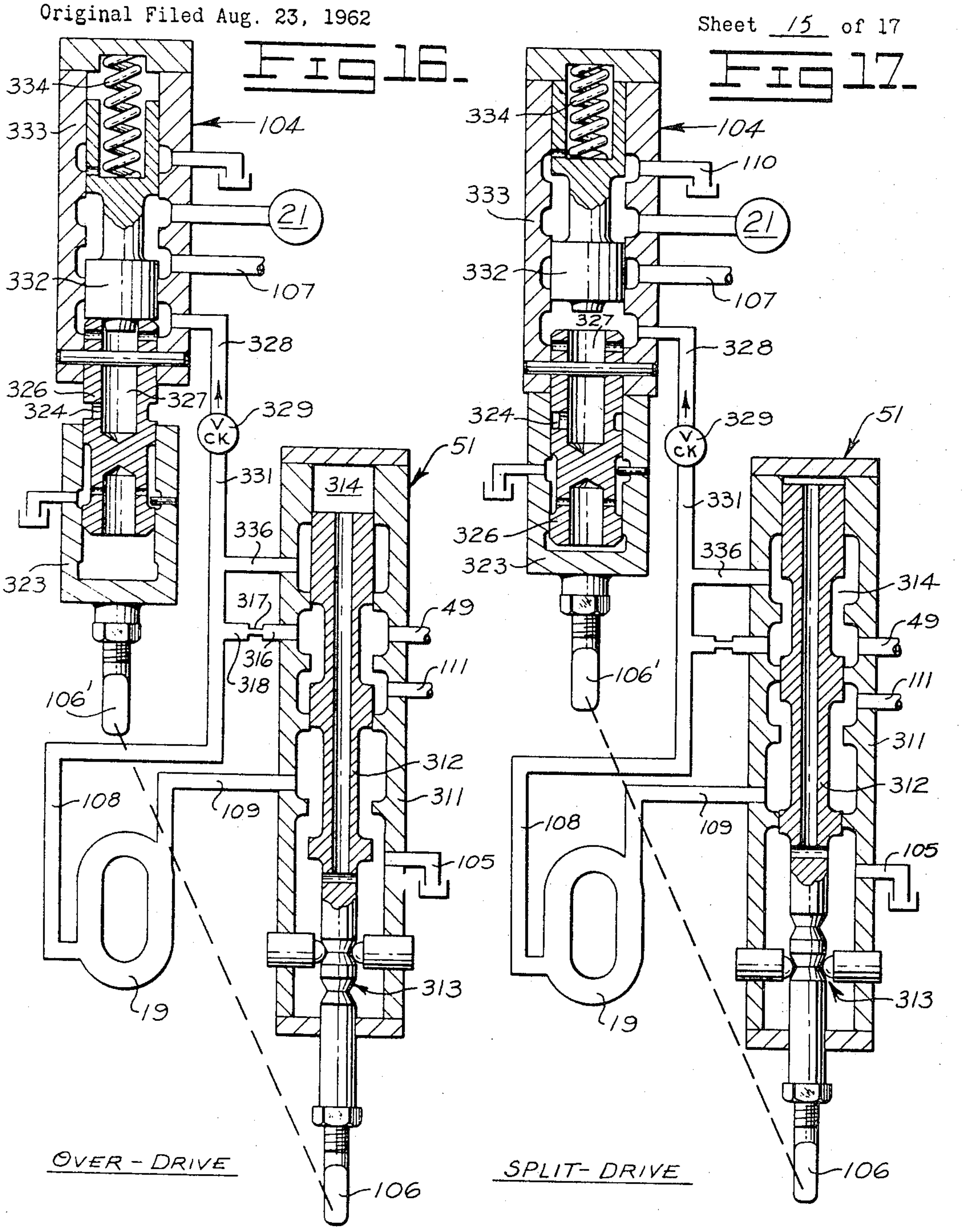
FIGS. 16 and 17 are schematic illustrations partially in cross section of the dump and fill valve and torque divider selector valve for selecting either mechanical overdrive or torque converter drive.

Referring to FIG. 16, dump and fill valve 51 comprises a valve body 311 and a valve spool 312 slidably disposed therein. A detent generally indicated at 313 retains valve spool 312 in one of two longitudinal positions within the valve bore 314 of valve body 311. A source of pressure fluid is provided to the dump and fill valve from regulating valve unit 43 via conduit 49. FIG. 16 illustrates the dump and fill valve in the position it assumes when lever 82 is in the overdrive position. The incoming fluid flows around valve body 312 and enters an output conduit 316 which contains a restrictive orifice 317 limiting the flow therepast to a desired quantity (e.g., 2 g.p.m.). The fluid which flows through restrictive orifice 317 passes into conduit 318 which connects with another conduit 108 which leads to torque converter 19. A conduit 109 provides an output path for the fluid from the torque converter and communicates the torque converter with the bore 314 of dump and fill valve 51. In the overdrive position, as illustrated, the conduit 109 communicates through valve bore 314 to a dump line 105 thus preventing the build up of pressure in the torque converter. As explained in the discussion of the overall system, the overdrive position of the front transmission 11 does not include the torque converter 19 in the power path and thus the inability of pressure to build up in the torque converter renders it inoperative even though the impeller thereof may be rotated.

Lever 106 connected to spool 312 is also mechanically connected to lever 106' which is connected to cylinder 323 of torque divider selector 104. Thus, when lever 106 is in its downward position to achieve the overdrive condition of the front transmission, lever 106' will also be in a downward position and cylinder 323 will uncover a port 324 in valve spool 326. A central chamber 327 in valve spool 326 receives fluid from a conduit 328 which connects through a check valve 329 with a conduit 331 which is in communication with the intersection of conduits 318 and 108. Check valve 329 allows fluid flow from conduit 331 to conduit 328 but prevents flow in the reverse direction. Thus, even though the flow is greatly restricted by orifice 317 some fluid may enter chamber 327 of spool 326 but will be unable to build the pressure up therein as the fluid will drain out of port 324. The lack of pressure in chamber 327 enables a spool 332 slidably disposed in valve body 333 of torque divider selector valve 104 to move downward in response to biasing spring 334. When spool 332 is in its downward position, communication exists between conduit 107 from speed selector valve unit 66 and overdrive clutch 21. The clutch will thus be engaged by the fluid which is delivered thereto at a rate regulated by the pressure control valve 63.

Referring now to FIG. 17, lever 106' is shown having been moved upward to achieve the split drive condition of the front transmission which is accompanied by an upward movement of lever 106 as well. In its upward position valve spool 312 forms communication between input conduit 49 and an unrestricted output conduit 336. Output conduit 336 also communicates with conduit 108 to torque converter 19 and being unrestricted is able to deliver fluid to the torque converter at a much greater rate (e.g., 40 g.p.m.). The dump line 105 which the torque converter output conduit 109 drained into the overdrive position is blocked by valve spool 312 and the output conduit 109 is instead communicated with an output conduit 111 which leads to a chamber in valve unit 43 (FIG. 5) maintained at a regulated pressure. Thus, the pressure is able to build up in torque converter 19 to a prescribed operating pressure so as to enable a portion of the vehicle driving power to pass through the torque converter. Fluid will also flow from output conduit 336 to conduit 328, through check valve 329 to conduit 328 from which it enters chamber 327 in spool 326. The upward positioning of cylinder 323 covers port 324 preventing drainage therethrough and enabling the pressure fluid delivered to chamber 327 to build up in pressure. As the pressure builds up in chamber 327 spool 332 is urged upward against the force of its biasing spring 334 and blocks the communication between conduit 107 and clutch 21. Clutch 21 is also communicated with a dump line 110 as a result of the upward movement of spool 332 and thus is completely disengaged.

By providing a dump and fill valve rather than a rotating clutch for introducing and extracting the use of the torque converter from the power path of the front transmission 11 a large quantity of power which would otherwise be lost is saved. The use of the restrictive orifice in one condition and the unrestricted conduit in the other condition enables the torque converter to be quickly filled when it is desired that it should operate in the system. In this manner the reduction of power loss by the elimination of a rotating clutch is at no sacrifice in the response of the system to a gear shift. A slight overlap in operation of split drive and overdrive during a shift, also prevents loss of power due to the lack of power transfer means. Check valve 329 insures that a temporary loss in pressure in valve bore 314 due to a gear shift in the range and cross drive transmissions will not cause a pressure drop in chamber 327 thus enabling the clutch 21 to continue to receive actuating fluid.

The interconnection of torque divider selector 104 and dump and fill valve 51 via conduits 318, 336, 331 and 328 enables the front transmission to be shifted from overdrive (FIG. 16) to split drive (FIG. 17) without a loss of power due to a discontinuity in means for transmitting torque. In other words, the arrangement insures that torque converter 19 is charged with sufficient pressure fluid to enable it to transmit torque before clutch 21 is separated from its source of engaging fluid and drained. It is necessary for the pressure in line 328 and chamber 327 to compress spring 334 before conduit 107 is blocked from clutch 21. When sufficient pressure is realized to compress spring 334 the pressure in torque converter 19 will also realize an increase in pressure. By the proper choice of a spring constant for spring 334, the pressure at which conduit 107 becomes blocked from clutch 21 will be a pressure at which torque converter 19 becomes operative in transmitting torque. Thus, there is a perfect continuity of torque transmitting means in a shift from overdrive to split drive through the inner action of the torque divider selector valve and dump and fill valve. A shift from split drive to overdrive, however, results in an immediate loss of pressure in torque converter 19, and thus chamber 327, so that clutch 21 is communicated with charging line 107 immediately. Since there is no charging time required, as there is in a shift from overdrive to split drive, it is unnecessary to provide overlapping operation to prevent power loss.

While the invention has been described with reference to a single power train and specific operating pressures, it will be clear to those in the art that these factors are not limiting on the invention.

We claim:

1. In a hydraulic steering pressure control valve unit, the combination comprising:

fluid pressure control means hydraulically disposed between a first fluid inlet conduit and a first fluid compartment, said control means having an element responsive to fluid pressure to increase the pressure in the first fluid compartment by regulating the communication of fluid between the first fluid compartment and the first fluid inlet conduit;

first valve means hydraulically disposed between the first fluid compartment and the control means element, said first valve means further disposed between the control means element and a first low pressure dump line;

means communicating the first fluid inlet conduit with the control means element;

said first valve means responsive to fluid pressure in the first fluid compartment above a specified minimum pressure to block otherwise existing fluid communication between the control means element and the first low pressure dump line;

a first fluid outlet conduit from the first fluid compartment;

a second fluid outlet conduit communicable with said first fluid compartment; and second valve means selectively providing three operating conditions:

(A) said first fluid outlet conduit in communication with the first fluid compartment, said second fluid outlet conduit blocked from the first fluid compartment, and a second low pressure dump line blocked from the control means element;

(B) said first and second fluid outlet conduits in communication with the first fluid compartment and the second low pressure dump line in communication with the control means element; and (C) the second fluid outlet conduit in communication with the first fluid compartment, the first fluid outlet conduit blocked from the first fluid compartment, and the second low pressure dump line blocked from the control means element.

2. The steering pressure control valve unit of claim 1 further comprising:

a second fluid inlet conduit normally charged with low pressure fluid in communication with said first valve means; and a fluid path between a second fluid compartment and said first valve means, said path in communication with said second fluid inlet conduit when less than the maximum pressure exists in said first fluid compartment;

said second valve means selectively providing a fourth operating condition wherein;

(D) said second fluid outlet conduit is blocked from the first fluid compartment but in communication with the second fluid compartment, said fluid path, and said second fluid inlet conduit, the control means element is in communication with the second low pressure dump line, and said first fluid outlet conduit is in communication with said first fluid compartment.

3. The pressure control valve unit of claim 1 further comprising:

a manually actuated pressure control valve means;

a fluid carrying conduit normally charged with high pressure fluid in communication with said manually actuated pressure control valve means;

a third fluid outlet conduit in communication with said manually actuated valve means and charged with fluid in response to actuation thereof, the value of the pressure in said third fluid outlet conduit selectable between zero and a set maximum depending upon the degree of actuation of said manually actuated pressure control valve;

and means communicating said third fluid outlet conduit with said second fluid outlet conduit when said second valve means is operated to provide said first named (A) condition.

4. In a hydraulic fluid selector valve unit, the combination comprising:

a first fluid inlet;

a first valve means having a set of fluid outlets associated therewith;

a second valve means having a set of fluid outlets associated therewith;

a first selector valve means hydraulically disposed between said first fluid inlet and said first valve means;

a second selector valve means hydraulically disposed between said first fluid inlet and said second valve means;

said second valve means having a plurality of positions, each of which provides communication between a particular fluid outlet associated with said second valve means and said second selector valve means;

a second fluid inlet;

said first selector valve means hydraulically located between said first valve means and said second fluid inlet;

said first selector valve means having a first position in which said first valve means is blocked from said second fluid inlet and communicated with said first fluid inlet, and a second position in which said first valve means is communicated with said second fluid inlet and blocked from said first fluid inlet;

said second selector valve means hydraulically located between said second valve means and said second fluid inlet;

said second selector valve means having a first position in which said second valve means is blocked from said second fluid inlet and in communication with said first fluid inlet, and a second position in which said second valve means is blocked from said first fluid inlet and in communication with said second fluid inlet; and a third fluid inlet communicating with at least one fluid outlet associated with each of said first and second valve means wherein said third fluid inlet is blocked from communication with the particular fluid outlets in communication with said first and second fluid inlets.

5. The hydraulic selector valve unit of claim 4 further described by:

said first and second valve means are positioned in response to hydraulic fluid signals.

6. The hydraulic selector valve unit of claim 4 further comprising:

a fourth fluid inlet with at least one fluid outlet associated with each of said first and second valve means when said first and second selector valve means are in their first positions, and blocked from the first valve means when said first selector valve means is in its second position and from the second valve means when the second selector valve means is in its second position.

7. The hydraulic fluid selector valve unit of claim 4 further described by:

the fluid outlets associated with said first valve means have corresponding fluid outlets associated with said second valve means, said first and second valve means are positionally dependent such that corresponding fluid outlets are communicated with said first or second fluid inlets; and one of said first and second selector valve means is in its first position whenever the other is in its second position.

8. In a hydraulic fluid selector valve unit, the combination comprising:

a first valve means having a plurality of fluid outlets associated therewith;

a second valve means having a plurality of fluid outlets associated therewith;

a first fluid inlet;

a second fluid inlet;

a first selector valve means hydraulically disposed between said first fluid inlet and said first valve means;

said first selector valve means having a first position in which communication is provided between said first fluid inlet and said first valve means, said first selector valve means also hydraulically disposed between said second fluid inlet and said first valve means, and said first selector valve means having a second position in which communication is provided between said second fluid inlet and said first valve means; and a second selector valve means hydraulically disposed between said first fluid inlet and said second valve means;

said second selector valve means having a first position in which communication is provided between said first fluid inlet and said second valve means, said second selector valve means also hydraulically disposed between said second fluid inlet and said second valve means, and said second selector valve means having a second position in which communication is provided between said second fluid inlet and said second valve means.

9. The hydraulic fluid selector valve unit of claim 8 further described by:

said first and second valve means are positionable to provide communication between one of their associated fluid outlets and said first and second selector valve means respectively; and said first selector valve means is in its first position when said second selector valve means is in its second position and said second selector valve means is in its first position when said first selector valve means is in its second position.

10. A pressure control valve unit comprising in combination:

a modulation reduction valve which receives fluid from a source and transfers it to a fluid compartment;

said modulation reduction valve having a pressure reactive element which controls the pressure in the fluid compartment by forcing said modulation reduction valve to a position wherein the fluid communication between said source and said fluid compartment is blocked;

a pressure differential valve in communication with said fluid compartment and transferring a portion of the fluid in the fluid compartment to a first fluid outlet, the pressure in the first fluid outlet being a fixed value less than the pressure in the fluid compartment;

means communicating the pressure reactive element with the first fluid outlet; and a second fluid outlet in communication with the fluid compartment.

11. The pressure control valve unit of claim 10 further comprising:

a safety reset valve hydraulically disposed between said pressure differential valve and said modulation reduction valve;

said safety reset valve preventing fluid communication between said pressure differential valve and said modulation reduction valve, through the fluid compartment, until hydraulically actuated.

References Cited

FOREIGN PATENTS 493,553 10/1938 Great Britain.

M. CARY NELSON, *Primary Examiner.*

MICHAEL O. STURM, *Assistant Examiner.*

U.S. Cl. X.R.

137—505.13, 596